INVENTORS
ABRAHAM TATZ
FREDERICK H. BATTLE, JR.

ATTORNEYS

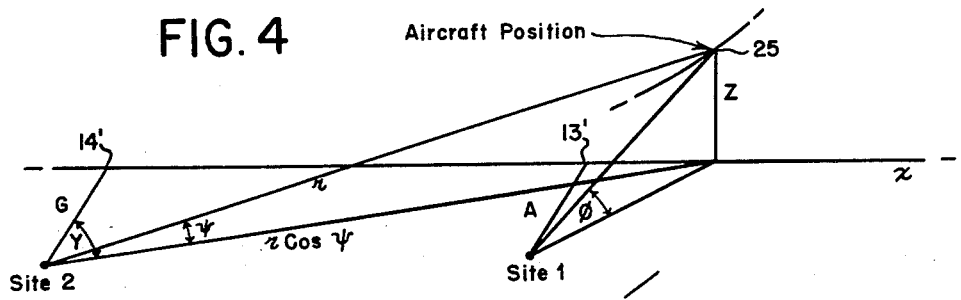
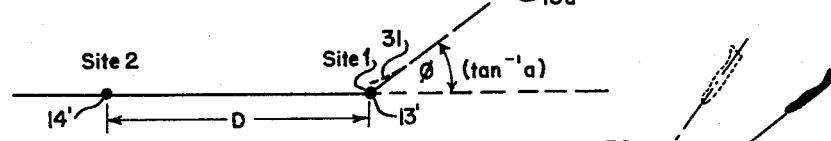
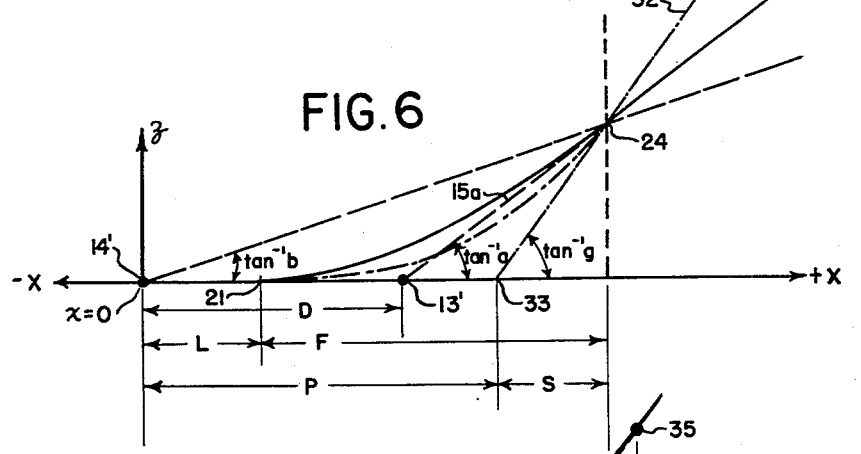
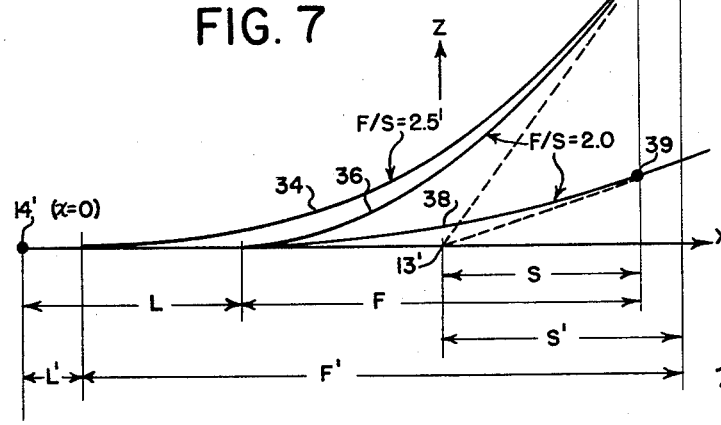

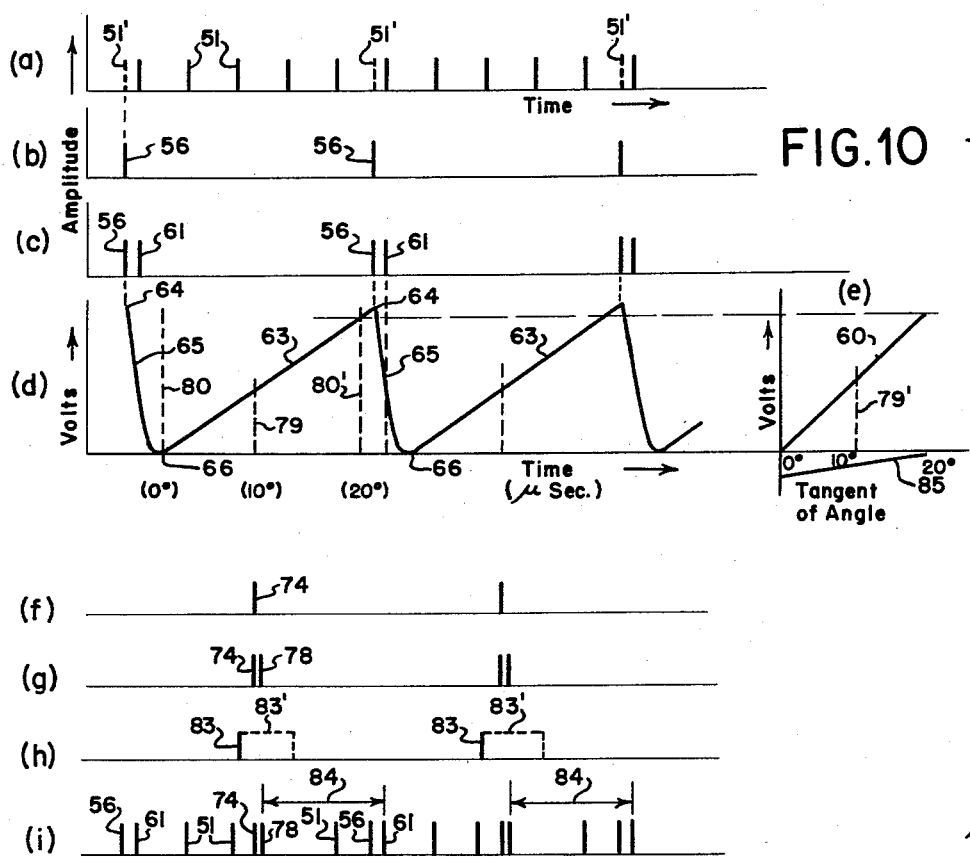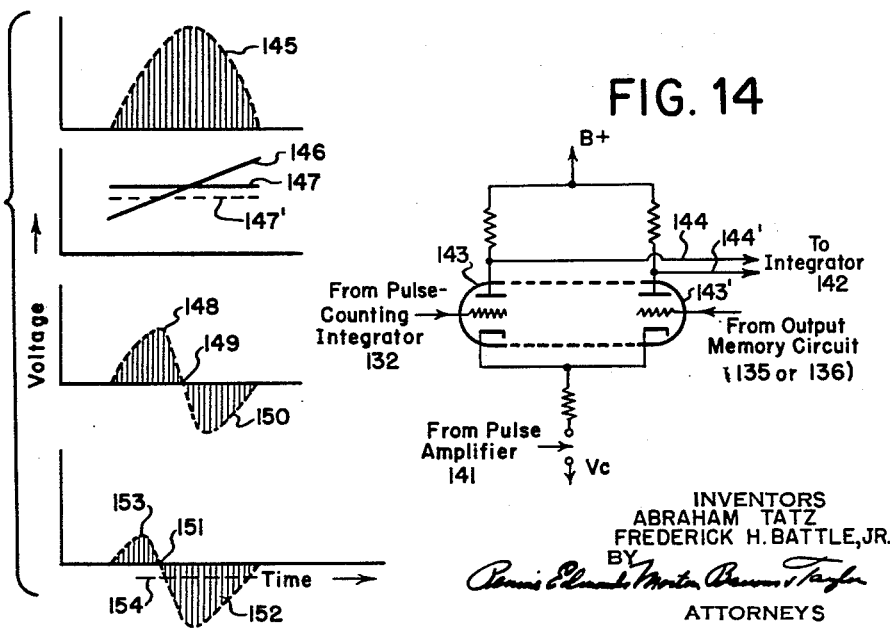

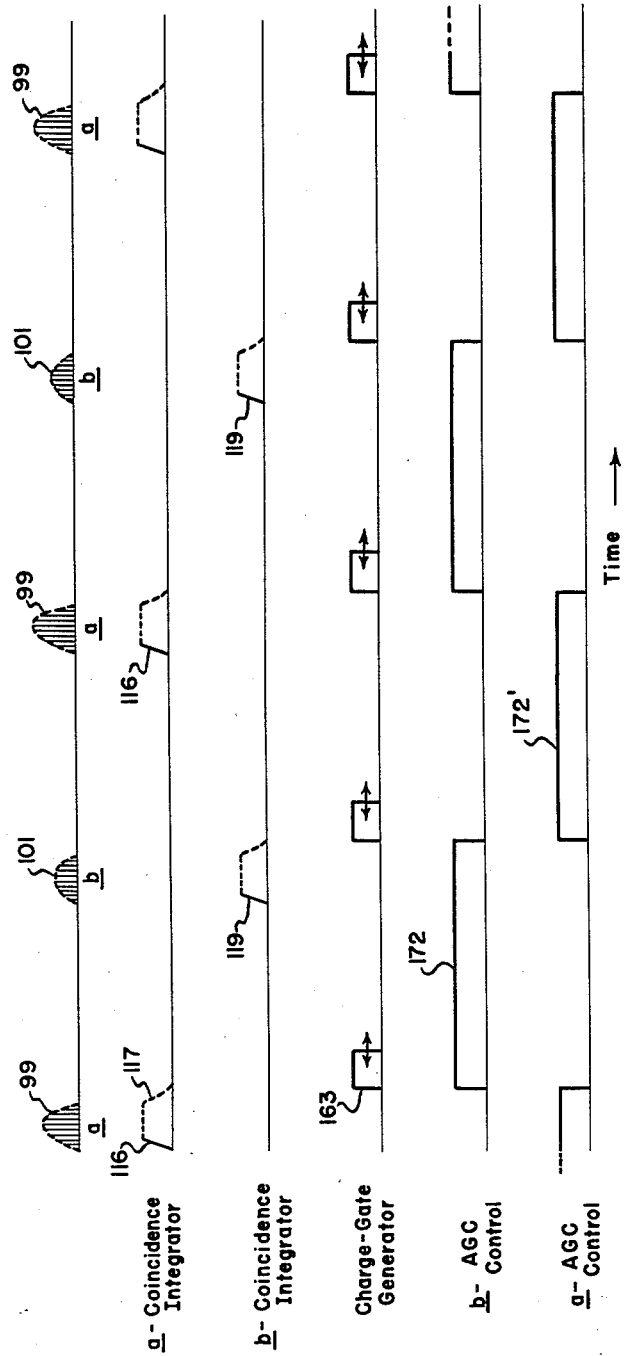

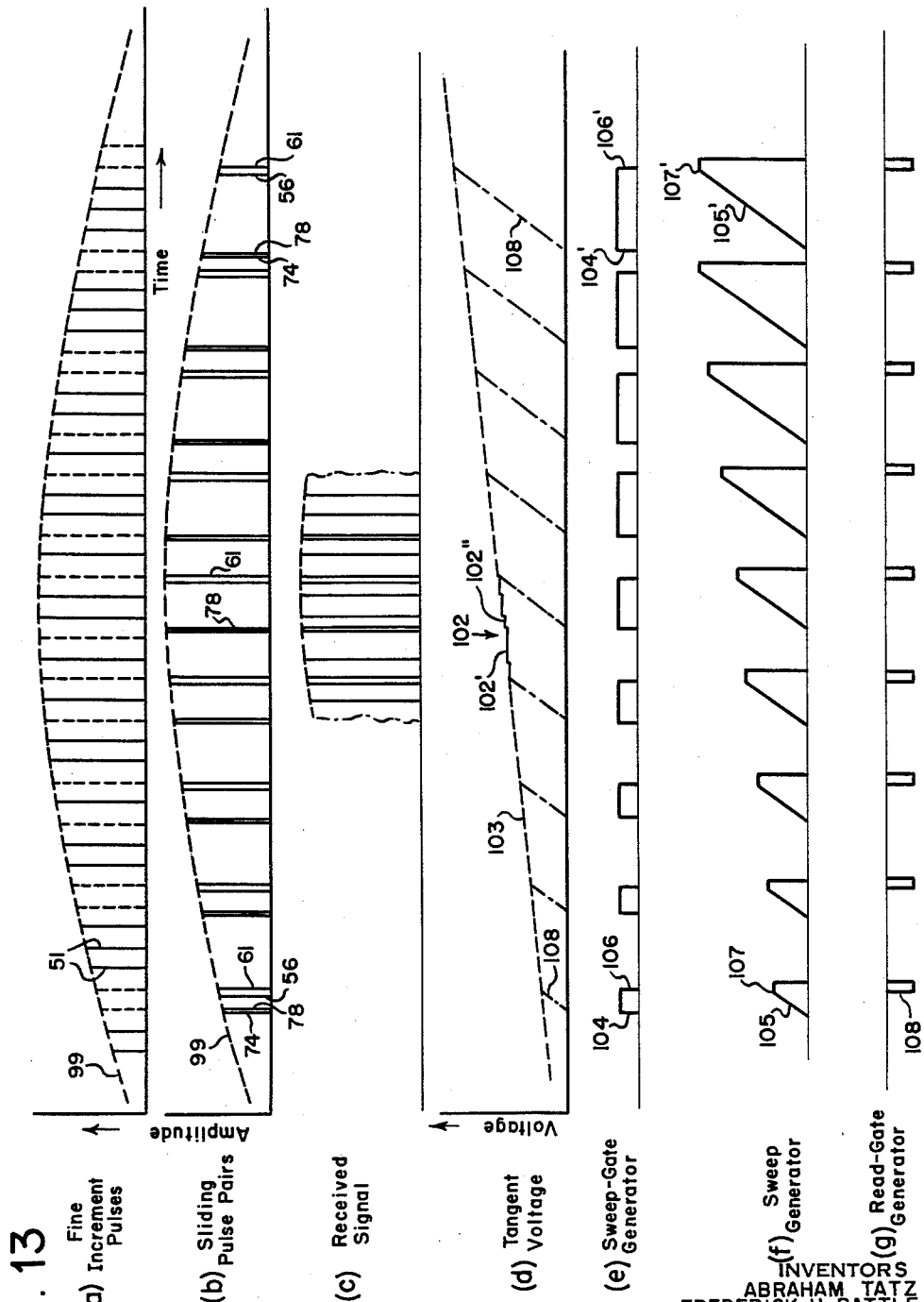

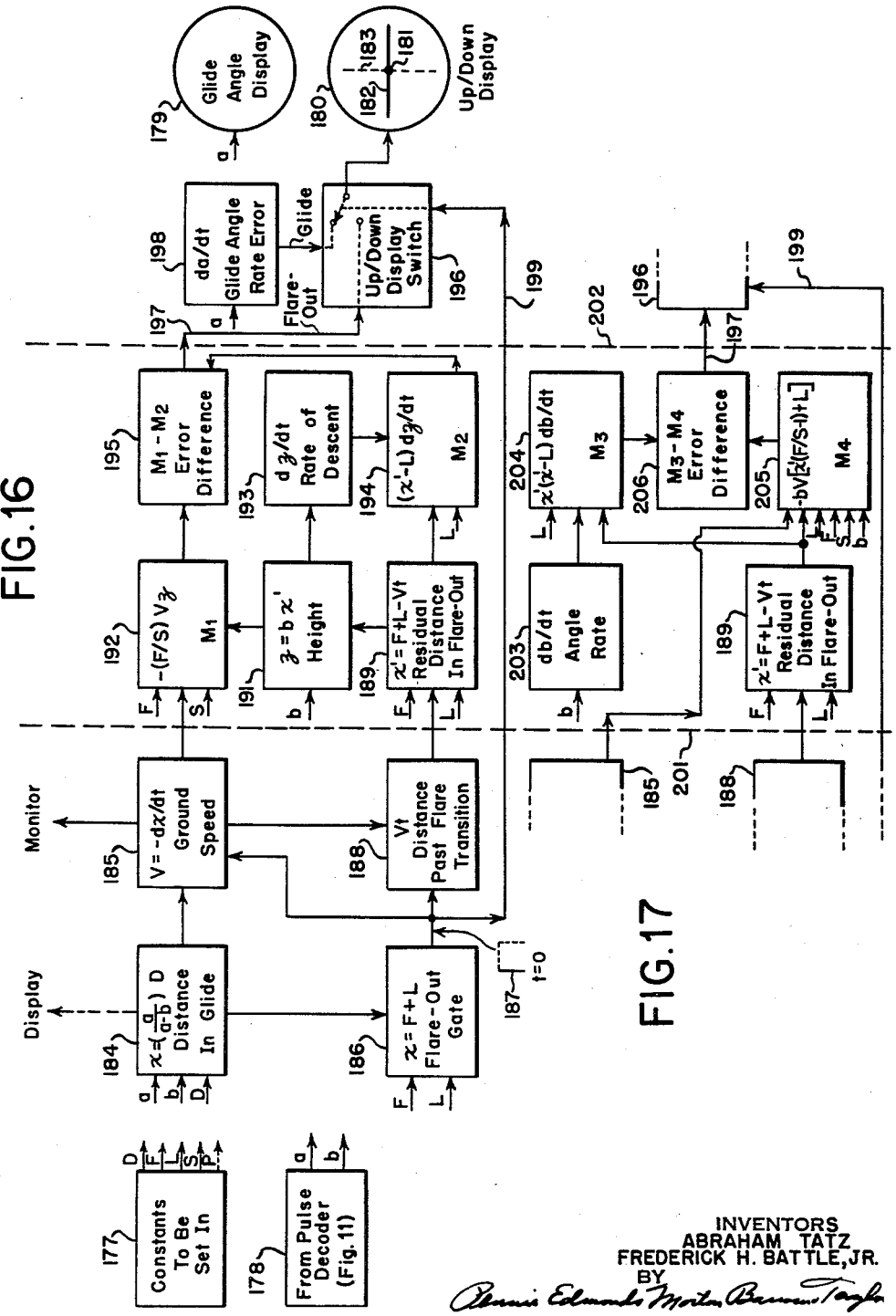

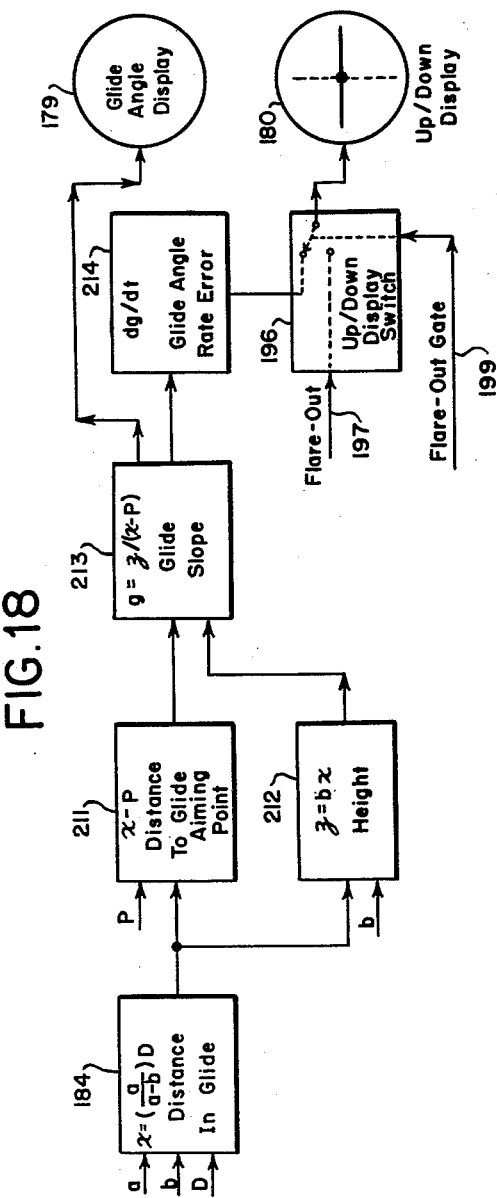
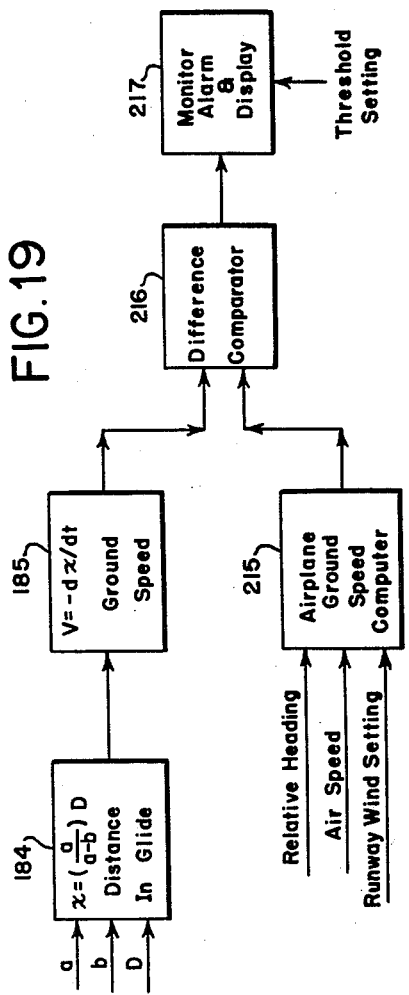

3,157,877
AIRCRAFT LANDING SYSTEM
Abraham Tatz, Levittown, and Frederick H. Battle, Jr., Seaford, N.Y., assignors to Cutler-Hammer, Inc., Milwaukee, Wis., a corporation of Delaware
Filed June 28, 1961, Ser. No. 123,928
9 Claims. (Cl. 343—108)

This invention relates to radio aids to the navigation of aircraft, and particularly to improvements in landing systems capable of guiding aircraft to touchdown.

Many aircraft landing systems employing radio, radar and other principles, have been suggested in the past, and several are now in use. Known systems have one or more limitations which seriously detract from their usefulness. Among such limitations are: (1) restriction of guidance to flight paths on or very near to a single line in space; (2) inadequate accuracy in the measured spatial position of the aircraft and/or the rates of change thereof; (3) low traffic handling ability; (4) inability to test and monitor adequately the performance of both ground-based and airborne equipment just prior to reliance thereon for a landing maneuver; (5) requirements for remote or otherwise specially located or specially prepared parcels of land for the installation or proper operation of ground-based equipment, which may not be feasible in many locations; (6) excessive weight, volume, complexity and cost of the airborne equipment, etc.

At the present time the traffic density in and near the major airports is so high as to render traffic handling very difficult under bad weather conditions. This is because of the limited number of planes which can be handled with present guidance systems, and requirements for minimum ceilings and visibilities.

Traffic handling ability is impaired when substantially a single flight path must be used sequentially by landing aircraft, particularly when they are different types. It is also impaired when transmission of information between ground and plane which is specific to a given plane is required.

With the advent of jet airplanes, the problem becomes more complicated both because of the limited time such planes can be "stacked up" over an airport before landing, and because their aerodynamic characteristics call for optimum flight paths in landing which may be quite different from piston-engine planes. Even in the latter category, an approach path that is optimum for a light plane is not necessarily optimum for a heavy transport, and that for a helicopter is still different.

Limitations of accuracy, particularly during the final phases of a landing maneuver, are highly disadvantageous. At the present time, in commercial operations, it is customary to require at least a certain amount of visibility on and near the ground so that a pilot can perform the final landing phases visually. While instrument landings have been made under emergency conditions, when ground visibility approaches zero, particularly in the case of military aircraft, present-day systems are not considered sufficiently accurate and reliable for routine landings under such conditions. Thus, diversion to other landing fields is often required which is inconvenient and sometimes disastrous.

Inability to test and monitor the overall performance of a landing system just prior to its use in a landing maneuver is inherently dangerous because any failure or malfunctioning may be discovered too late to discontinue the attempt to land.

The present invention provides a landing system which is capable of guiding aircraft accurately and reliably both during the initial portions of the landing maneuver and the final portions to touchdown on the runway. The system permits the selection of any one of a large number of landing paths to suit the aerodynamics of different planes or special conditions that may arise. The ground-based equipment can be located near the runway and the acquisition of parcels of land remote from the runway will commonly not be required. The weight, volume, complexity and cost of the airborne equipment are kept within practical limits by utilizing similar types of data for guidance and control functions throughout the landing maneuver. The system can be checked at a considerable distance from the runway and its indications compared with conventional airborne instruments.

In accordance with the invention a pair of ground-based transmitters are spaced along the runway and transmit fan-shaped beams which repeatedly scan in elevation from a lower limit, say 0°, to an upper limit determined by the maximum glide angle any plane may be expected to follow, say 20°. The two fan-shaped beams are coded so that, by suitable apparatus in the aircraft, the aircraft can determine its angular position with respect to both transmitters at frequently recurring intervals. Advantageously a particular form of pulse coding described hereinafter is employed. Then, by suitable computing and indicating means in the aircraft, a landing path is prescribed.

It is particularly contemplated that one of the ground-based transmitters will be located at or near the front end of the runway at what will be termed "Site 1." The second ground-based transmitter will be located an appropriate distance down the runway at "Site 2." During the initial portions of the landing maneuver a straight line glide path at an angle determined by the characteristics of the plane normally suffices. The beam from the forward Site 1 may be used to guide the plane during this initial portion by the pilot controlling his rate of descent so as to maintain a constant angle with respect to Site 1. Then, at an appropriate distance from the runway, the plane changes to more gradual rates of descent during the "flare-out" so that the plane contacts the runway gently and smoothly.

The transition point from glide to flare-out is computed in the aircraft by using the angular information from both Sites 1 and 2, together with other constants as described hereinafter. During the flare-out, angular information from the rear Site 2 is used continuously to compute and indicate the path the plane should follow until it touches down.

Under some circumstances it is desirable for the initial glide path to be aimed at a point in front of the runway threshold. This can be accomplished by utilizing the beams from both sites to establish a glide angle with respect to such a point.

Since the beam from the front or Site 1 transmitter is used for guidance primarily during the glide portion of the landing maneuver, the transmitter may be termed a glide angle guidance beam transmitter. Similarly, the rear Site 2 transmitter may be termed a flare-out guidance beam transmitter since its beam is used for guidance primarily during flare-out.

Although it is preferred to employ vertically scanning beams at both front and rear sites, it is possible to employ a fixed glide path system instead of a scanning beam at the front site if advantages such as choice of glide angle, increased accuracy of guide angle information, greater departure from the desired glide path while retaining guidance information, etc. are sacrificed. This enables an existing landing beam system to be employed for glide angle guidance, in combination with a scanning beam for flare-out guidance, and may be satisfactory as an interim system or in situations where the full capabilities of the preferred system are unnecessary.

The invention will be described in connection with specific embodiments thereof. Many advantages will be pointed out in connection with the embodiments, and others will be obvious to those skilled in the art.

In the drawings:

FIGS. 1–7 are schematics illustrating the principles of the invention;

FIG. 10 shows waveforms explanatory of the pulse encoder;

FIGS. 12 and 13 show waveforms illustrative of the operation of the receiver of FIG. 11;

FIGS. 14 and 15 show a schematic and illustrative waveforms of one form of voltage comparator used in the receiver of FIG. 11;

FIG. 16 is a block diagram of one embodiment of an airborne computer;

FIG. 17 illustrates a modification of one portion of the computer of FIG. 16;

FIG. 18 is a block diagram of a computer for establishing a glide aiming point ahead of Site 1; and FIG. 19 shows apparatus for checking the landing system against an airborne ground speed computer operating on conventional principles.

In the following description numerical figures will be given to facilitate explanation. It will be understood that this is for purposes of illustration only, and the invention is not confined thereto.

Figure 1:
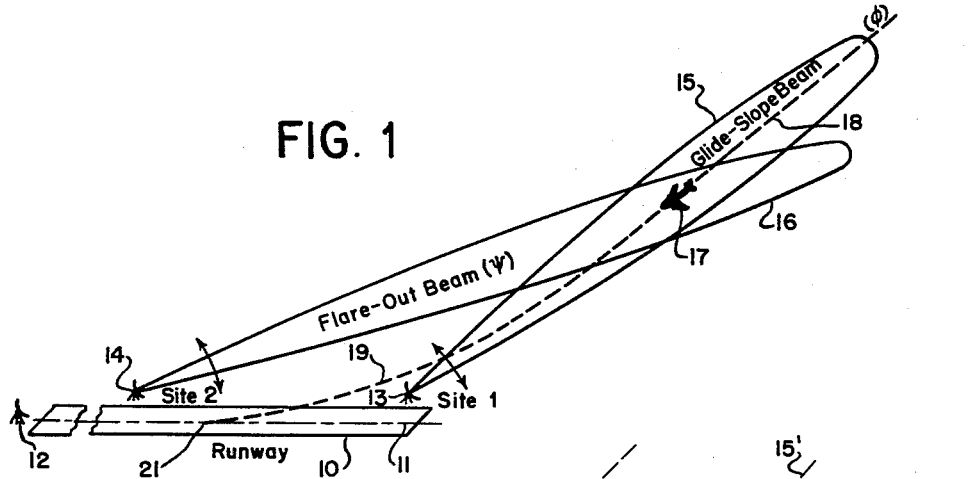

Referring to FIG. 1, a runway is indicated at 10 and the center line thereof at 11. A localizer is indicated at 12 which may be of any type suitable for guiding an aircraft in azimuth so that its flight path is along the center line of the runway.

Two vertically scanning antennas are shown at 13, 14 and designated "Site 1" and "Site 2." Site 1 is advantageously located near the front end of the runway sufficiently to one side thereof so as not to be an obstacle. Site 2 is located down the runway a suitable distance, say 4,000 feet, and also to one side thereof. Sites 1 and 2 may be on the same side of the runway as shown, or on opposite sides.

The beams transmitted from Sites 1 and 2 are designated 15 and 16, respectively. These beams are narrow in the vertical plane, of the order of 0.5° between half-power points being contemplated in one specific embodiment, but are shown somewhat wider for clarity. They are advantageously wide in the horizontal direction so as to be receivable by aircraft throughout the spatial volume normally occupied during landing maneuvers.

An airplane 17 is shown flying along a landing path comprising a glide portion 18 and a flare-out portion 19. It is here assumed that the glide portion is a straight line at a desired slope. This represents a type of path normally satisfactory for the initial portions of the landing maneuver and will be assumed hereinafter, although it would be possible to utilize information from the two beams to establish a different type of glide path.

During the flare-out 19, the rate of descent of the plane is gradually reduced, that is, the path gradually becomes more shallow, until, at the touch-down point 21, it does not exceed a prescribed rate determined by the ruggedness of the plane and its use. For commercial passenger planes a rate of descent not exceeding about 2 ft./sec. is desirable, whereas for military planes it is sometimes considerably greater.

Figure 2:
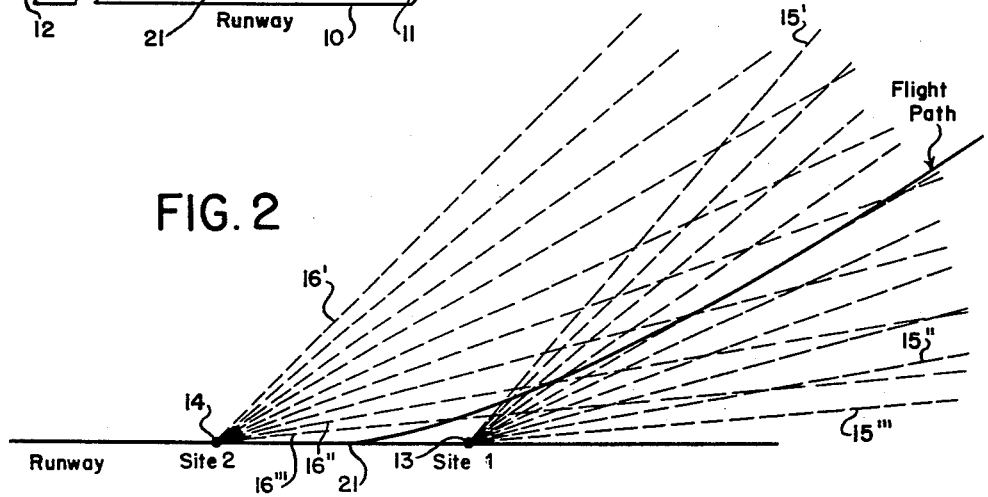

As shown by double-headed arrows in FIG. 1, the beams from Sites 1 and 2 repeatedly scan in the vertical direction. In FIG. 2, the successive positions of the center line of beam 15 from Site 1 are shown by lines 15', 15" . . . 15'''. Similarly, lines 16', 16" . . . 16''' show the successive positions of the center line of beam 16 from Site 2. The angular relationships are exaggerated for clarity. In one specific embodiment, it is contemplated that the lowest positions 15''', 16''' will be substantially horizontal whereas the upper positions 15', 16' will be at an elevation of about 20°. Although the two beams could be transmitted simultaneously, it is particularly contemplated to transmit them alternately on a time sharing basis with suitable coding so that the airborne receiver can distinguish between them. This permits the transmitters to have the same frequency, and reduces the complexity of the airborne receiver.

It is desirable to scan the beams at as high a repetition rate as practical so that the angle information is received by the plane at sufficiently short intervals for precise indication of its course. The speed of scanning is limited, however, by the data rates required to maintain precision of angular information.

In order to secure the desired narrow beams in the vertical direction with a reasonable size antenna, and also to avoid interference from ground reflections, it is advantageous to use frequencies high in the microwave band. For example, in one embodiment a K-band frequency of the order of 16,000 megacycles per second is contemplated. A vertical scanning rate of 10 cycles per second (5 cycles per second for each beam) is contemplated at the present time as being within the capabilities of the art and providing angle data at sufficiently close intervals.

An airplane flying along the indicated glide path will obtain angle readings from both Sites 1 and 2. By geometry, the position of the aircraft in the vertical plane can be determined from the measured angles with respect to Sites 1 and 2 and the known distance between the two sites. Suitable computers utilizing this information will be described hereinafter.

Figure 3:
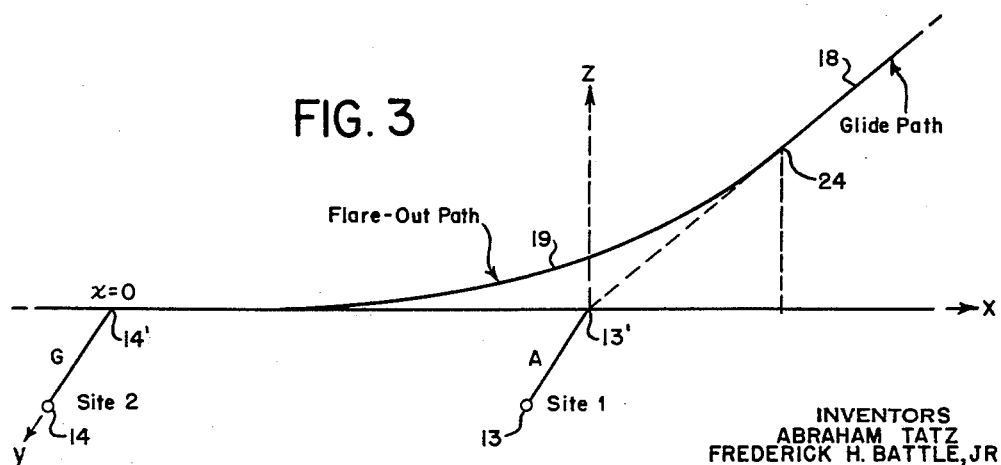

Referring to FIG. 3, suitable coordinate axes for the flight path and the sites are shown. The $x$ axis lies along the center line of the runway and is positive toward the approaching aircraft. Sites 1 and 2 are laterally displaced from the runway along the $y$ axis. The sites may be on either side of the runway and at the same or different distances therefrom denoted A and G, respectively. For convenience, the coordinate $x=0$ is taken at the center line of the runway opposite Site 2. Vertical distances or height are taken along the $z$ axis. The transition point from the straight line glide path 18 to the flare-out path 19 is at 24.

FIG. 4 shows the actual geometric relationships between Sites 1 and 2 and the aircraft position 25 (at a point in a vertical plane through the runway center line). The height of the plane is indicated as $z$, and its angle with respect to Site 1 is $\phi$. The angle of the plane with respect to Site 2 is $\psi$. The distance of the plane from Site 2 is denoted $r$. Accordingly, the horizontal distance from the plane to Site 2 is $r \cos \psi$. The angle between this horizontal distance and perpendicular G to the runway center line is denoted $\gamma$.

From the angles $\phi$, $\psi$ and $\gamma$ and the known constants, it would be possible to compute the exact distances of the plane from points 13' and 14', taking into account the lateral displacements of Sites 1 and 2 from the runway center line. However, this will commonly be unnecessary. Ordinarily it will be possible to place Sites 1 and 2 sufficiently close to the runway without endangering planes so that distances A and G can be neglected. Thus, Sites 1 and 2 can be treated mathematically as though they were actually on the center line of the runway and the angles were with respect to points 13' and 14'. For example, it is found that distances A and G up to approximately 600 ft. may be neglected with negligible error. However, they can be taken into account if desired. In the subsequent presentation it will be assumed that the angles from Sites 1 and 2 are the same as the angles at points 13', 14' on the runway center line opposite the sites.

FIG. 5 illustrates the factors involved during the initial glide portion of the landing maneuver. It is contemplated that only angular information from Site 1 will be employed for a glide aiming point at 13′, and the axis of symmetry of the beam is denoted 15a. As the aircraft flies toward the runway, the airborne receiver gives the pilot continuous information as to his angle from Site 1. When the angle becomes equal to that desired for the glide, the pilot begins his descent. By controlling the plane to fly along a selected angle with respect to Site 1, a proper path is maintained. Alternatively, a proper path can be insured by flying the plane so as to maintain the rate of change of the angle from Site 1 equal to zero. If at any time the rate of change of angle $(d\phi/dt)$ differs from zero, the pilot flies up or down to return to zero.

The equations for aircraft position and computation of paths often involve tangents of the angles from the sites. For the angles here involved, the tangent and radian values are very close, and angle values often suffice. In the following description and specific embodiments the tangents will be used for completeness, since simplification to use the angles instead will be readily understood. When tangents are employed, each beam may be coded in terms of the tangent of the angle of elevation. By maintaining zero rate of change of the tangent, denoted $a$ for the front beam, the same results are obtained as maintaining zero rate of change of the angle.

A particular advantage of this mode of operation is that if disturbances arise during the landing procedure, such as up drafts or down drafts, the pilot need only control his plane to maintain $da/dt$ equal to zero. In the case of an up draft, this means that the actual angle with respect to Site 1 will be slightly increased, and if down draft slightly decreased. Such changes of actual angle are automatically taken into account in determining the transition to flare-out, as will be explained hereinafter.

In FIG. 5 the dotted line 31 indicates deviation with respect to the center line of the runway with a conic-surface scanning beam, due to the fact that Site 1 is to one side thereof. The aircraft normally changes to the flare-out path before this region is reached, and in any event the deviation is in the direction of the transition from glide to flare-out paths. With a flat scanning beam no error will result from the site being offset.

Before proceeding with the discussion of the flare-out path, certain quantities will be defined which will be employed hereinafter.

Referring to FIG. 6, the x-axis is taken along the center of the runway with the origin at 14′ opposite Site 2. The z-axis is vertical, and represents height. Point 13′ is on the runway opposite Site 1. Beam angles are assumed to be the same at the runway as they are at the sites. Although in FIG. 5 the glide angle aiming point was at 13′ at the front end of the runway, the system may also be employed for aiming points ahead of the runway. In FIG. 6 this is shown by the dot-dash line 32 having a glide angle aiming point at 33. With this explanation the quantities shown in FIG. 6 may be defined as follows:

$a$=tangent of the elevation angle of the aircraft from Site 1;
$b$=tangent of the elevation angle of the aircraft from Site 2;
$g$=tangent of the angle of the aircraft from the guide angle aiming point;
$D$=longitudinal separation of Sites 1 and 2, measured along the runway;
$F$=horizontal length of the intended flare-out path from transition point 24 to touchdown point 21;
$L$=distance between touchdown point 21 and point 14′;
$P$=distance between guide angle aiming point 33 and point 14′;
$S$=horizontal distance between the transition point and the glide angle aiming point 33.

Referring now to FIG. 7, three possible flare-out paths are shown, each representing a successful landing maneuver for a particular aircraft. Flare-out path 34 represents a fairly gradual descent from transition point 35 on a relatively steep glide path. Flare-out path 36 represents a somewhat steeper flare-out from transition point 37 on the same steep glide path. Flare-out path 38 represents a fairly shallow path from transition point 39 on a less steep glide path. These flare-out paths are of the form represented by the equation:

$$\frac{dz}{dx}=\frac{(F/S)z}{x-L} \quad (1)$$

As shown, flare-out paths 36 and 38 have the same length F and the same touchdown point at $x=L$. Thus, the $F/S$ ratio is the same and is shown equal to 2.0.

On the other hand, flare-out path 34 is longer, as represented by F′, and the touchdown point is farther down the runway at $x=L'$. The transition point is somewhat farther from the runway threshold, as shown at S′. The ratio $F'/S'$ is equal to 2.5.

It will be understood that by selecting different values of F, L and S, either steeper or more gradual flare-out paths may be obtained. An appropriate path depends upon the characteristics of the plane, the desired rate of descent at touchdown, available length of runway, emergency conditions, etc. As will be explained hereinafter, these constants can be set into the airborne computer by the pilot to determine the type of flare-out desired. For a given aircraft and routine conditions, particular values may be standardized for normal use, while allowing the pilot freedom to change the values under abnormal conditions.

Figure 8:
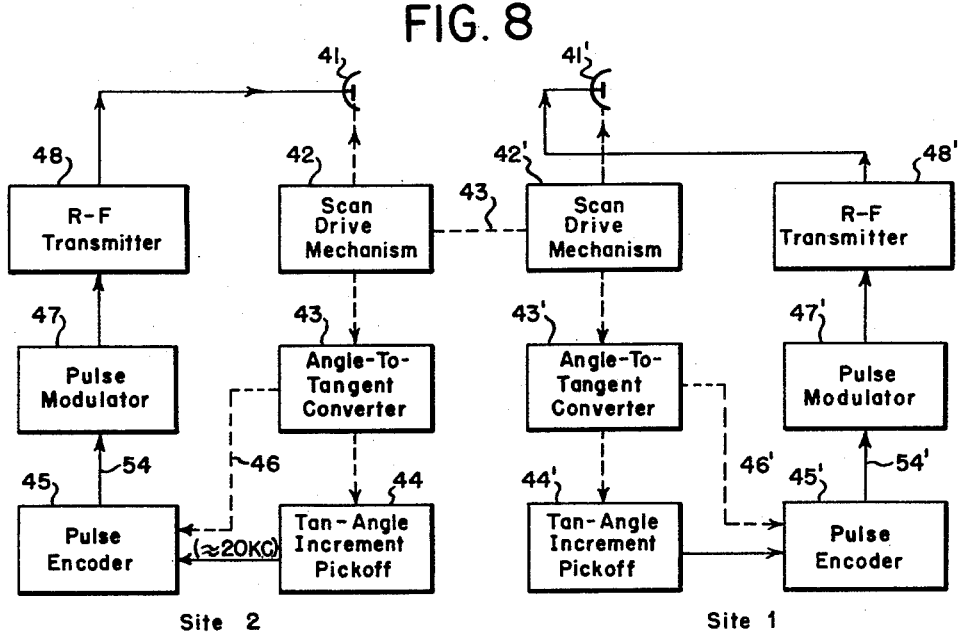
FIG. 8 is a block diagram of the ground-based transmitters.

Referring now to FIG. 8, a block diagram is shown of the transmitters at the two ground-based sites. Since they are similar, only one transmitter will be specifically described and similar components in the other will be given the same numerals with an added prime. Antenna 41 is driven by a suitable scan drive mechanism 42 so that the scanning beam moves in the vertical direction at a selected repetition rate. It is contemplated that the vertical scans of the two sites will alternate so that the transmitters will operae on a time shared basis. Accordingly, a suitable linkage 43 such as a servomechanism is employed between the drive mechanisms 42, 42′.

Various forms of scanning antennas are known in the art and may be employed as meets the requirements of a particular application. For accuracy, it is desirable to employ beams which are fairly narrow in the vertical plane. For example, beam widths of the order of 0.5° are contemplated. Even at microwave frequencies, such beam widths require a fairly large antenna, for example, one having a height of the order of 10 feet or so. Instead of moving the antenna as a whole, known arrangements may be employed in which only the feed lines are moved or the phasing changed.

As has been mentioned hereinbefore, in computation tangent functions of the elevation angles rather than the angles themselves may be involved. When tangent functions are employed, conversion from angles to the tangents thereof may take place on the ground or in the airborne equipment, but it is preferred to make the transformation on the ground so as to reduce the weight, etc. of the airborne equipment. In FIG. 8 it is assumed that the antenna and scan drive mechanism are designed to produce elevation angles proportional to the movement of a member in the drive mechanism, say the rotation of a shaft. The scan drive mechanism then drives an angle-to-tangent converter 43 which gives an output proportional to the tangent of the angle. In some applications it may be feasible to design the antenna and drive mechanism to produce directly an output representing the tangent of the angle. Converter 43 drives suitable means 44 for producing electrical signals varying with the tangent of the elevation angle.

In the particular embodiment here described, elevation information for each beam is conveyed to an aircraft by two sets of pulses. The first set consists of single pulses representing equal increments of the tangent of the angle. A coded pulse pair is transmitted at suitable intervals to permit identification of the beam. For example, a pair of pulses may be transmitted in place of each fifth increment pulse and the spacing between the pulses of the pair may be different for the two sites, say a 12 microsecond spacing for one site and a 16 microsecond spacing for the other.

Reception of the increment pulses in an aircraft will give accurate indications of changes in the angle with respect to a given site, but will not give the absolute value thereof. Accordingly, a second pair of pulses is generated at each site whose time occurrence with respect to the identification pulse pair varies as a function of the tangent of the absolute elevation angle. The second pulse pair will be termed the "sliding" pulse pair, and the identification pulse pair will often be referred to as the "reference" pulse pair in this connection.

The pulses in the sliding pair may have a time spacing different from that of the reference pair at either site, say 14 microseconds. This enables the sliding pair to be identified readily in the airborne receiver. The spacing of the pulses in the sliding pair may be the same for both sites, since the reference pulses provide adequate information for identification purposes.

The increment pulses may be generated in any desired manner. For example, a toothed wheel arrangement with magnetic pickoff may be driven by converter 43. Hence, 44 is termed the "Tan-Angle Increment Pickoff." The output of 44 is supplied to the pulse encoder 45. For vertical scanning rates of 10 scans per second alternating between the two antennas, each antenna will scan its vertical range in one-tenth of a second and repeat the scan five times per second. If a total angle of 20° be assumed and 2,000 pulses transmitted at equal tangent increments during a 0.1 second scan, the average pulse repetition frequency will be 20 kc. Successive pulses will represent somewhat different angular increments during the scan, but the angular increments will average 0.01°.

In order to generate the sliding pulse pair, the output of the converter 43 is likewise supplied to the pulse encoder 45 through a connection 46. One way of obtaining the sliding pair will be described in connection with FIG. 9. The output of the pulse encoder is supplied to the pulse modulator 47 and thence to the RF transmitter 48 which is connected to the antenna 41.

Certain practical limitations are imposed on the pulse repetition frequency by the RF power that can be developed with available means, the distance from the runway at which it is desired to have an aircraft pick up signals reliably, etc. At the present time a PRF of 20,000 appears to be a reasonable choice. However, if such factors permit higher repetition frequencies to be employed, the vertical scanning rate may be increased so that an aircraft receives angle information more frequently, or pulses may represent smaller increments, etc.

Figure 9:
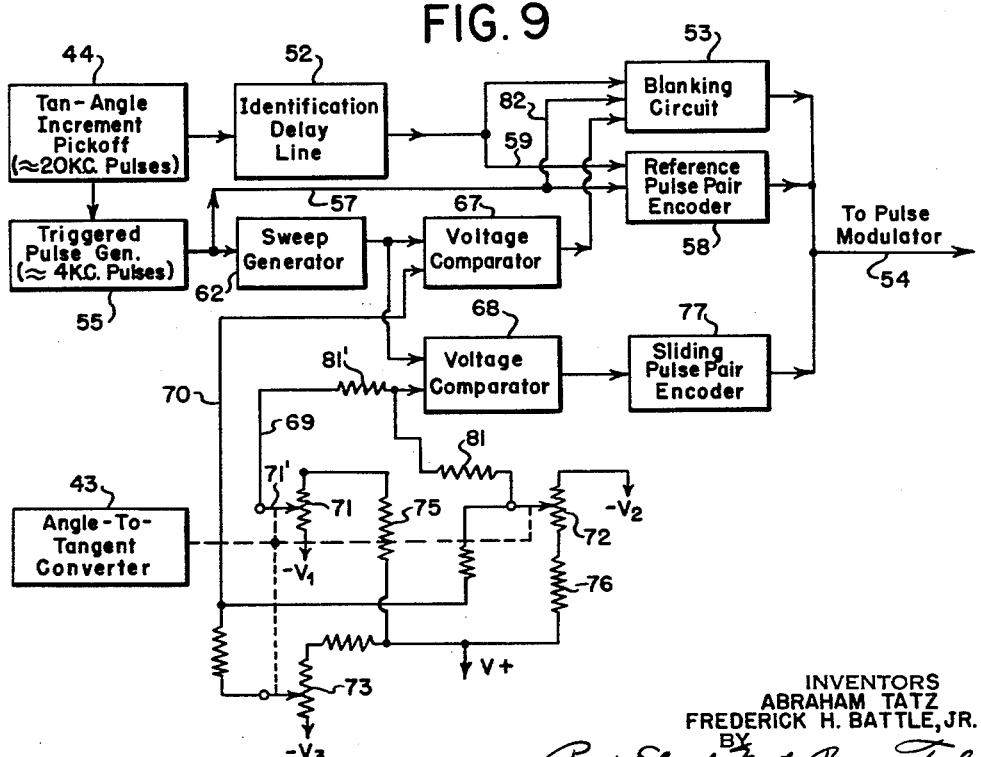
FIG. 9 is a diagram, partially schematic, of a pulse encoder at a ground station.

Referring to FIGS. 9 and 10, a particular embodiment of a pulse encoder will be described in conjunction with waveforms applicable thereto. The increment pulses from pickoff 44 are supplied through an identification delay line 52 and a blanking circuit 53 to line 54 which leads to the pulse modulator. The increment pulses in line 54 are shown at 51 in FIG. 10a. The purpose of the delay and blanking will be described hereinafter.

The increment pulses from pickoff 44 are also supplied to a triggered pulse generator 55 designed to generate pulses definitely related to the increment pulses. Advantageously, generator 55 is triggered at an integral submultiple of the increment pulses, and is here shown as triggered for each fifth increment pulse. Hence generator 55 will produce approximately four kilocycle per second pulses, as shown at 56 in FIG. 10b. The output of generator 55 is supplied through line 57 to a reference pulse pair encoder 58, and thence to the pulse modulator. Encoder 58 adds a second pulse to the output of generator 55 whose spacing serves to identify transmissions from a given site. In the case of Site 2, having a pulse pair separation of, say 16 microseconds, encoder 58 will add a pulse after 16 microseconds. This may be accomplished in various manners.

As here illustrated, pulses 56 occur simultaneously with given pulses 51' from pickoff 44 and are supplied direct to encoder 58. Pulses 51' are delayed in 52 by the desired coding interval, 16 microseconds, and are supplied to encoder 58 through line 59. Accordingly, they issue from encoder 58 sixteen microseconds after the occurrence of pulses 56 and form the second pulses 61 of the reference pulse pairs as shown in FIG. 10c. In this operation encoder 58 may be a gate circuit which is triggered on by a pulse 56 so as to pass that pulse and the next pulse from delay line 52, whereupon it closes its gate until the next pulse 56 arrives through line 57.

If desired, encoder 58 may be arranged to receive only pulses 56 through line 57, with line 59 omitted, and a delay line incorporated therein to repeat each pulse 56 after an interval of 16 microseconds.

In order to generate the sliding pulse pair, the output of generator 55 is supplied to a sweep generator 62 which generates a sweep varying linearly in time, as shown at 63 in FIG. 10d. The sweep is terminated on the arrival of a pulse 56, as shown at 64, and after a predetermined interval for retrace 65, starts a new sweep at 66.

The sweep 63 is supplied from generator 62 to voltage comparators 67 and 68. Comparator 68 is employed in developing the sliding pair, and 67 is used in connection with blanking. A voltage varying in accordance with the tangent of the beam elevation angle is supplied to the voltage comparator 68 through line 69. This latter voltage may be generated in any desired manner and one specific manner is shown in the lower portion of FIG. 9. Here the angle-to-tangent converter 43 is arranged to drive the sliders of potentiometers 71 and 72.

Potentiometers 71 and 72, together with voltage comparator 68, serve to generate the first pulse 74 of the sliding pulse pair, as shown in FIG. 10f. To this end, the potentiometers are supplied from a suitable voltage source V+ through high resistors 75 and 76. The lower end of the potentiometers are returned to suitable negative voltage sources denoted $-V_1$ and $-V_2$. Disregarding potentiometer 72 for the moment, the voltage sources V+ and $-V_1$, and the resistances of potentiometer 71 and resistor 75, are selected so that the voltage drop across potentiometer 71 is the voltage desired for the maximum tangent angle excursion. Thus, as slider 71' is driven by converter 43, the voltage in line 69 is proportional to the tangent of the elevation angle as shown by line 60 in FIG. 10e.

The voltage is compared in comparator 68 with the sweep voltage 63 and, when the two are equal, an output is supplied to the sliding pulse pair encoder 77 to generate the first pulse 74 of the sliding pair. The encoder 77 is arranged to supply a second pulse after a selected interval, here assumed to be 14 microseconds. The first and second pulses are shown at 74 and 78 of FIG. 10g. The particular position of pulse pair 74, 78 here shown corresponds to the tangent of angle near the middle of the sweep range, say 10°, as shown by the dotted line 79 in FIG. 10d. Dotted line 79' in FIG. 10e shows the corresponding position of the slider of potentiometer 71.

The repetition frequency of sweeps 63 is high compared to that of the elevation beam sweep represented by line 60, so that beam elevation information will be transmitted at short intervals during each vertical scan. With the numerical values here assumed, the sliding pair transmits elevation information once for each approximately 0.05° movement of the beam.

Inasmuch as the spacings of the sliding and reference pulse pairs are relied upon for identification in the airborne receiver, only a portion of sweep 63 is actually used, as shown between dotted lines 80 and 80'. This portion is selected so that the sliding pulse pair will never get close enough to the reference pulse pairs to produce an erroneous identification. With the numerical figures here used for illustration, a range of approximately 180 microseconds is available for the sliding pulse pair. This will leave at least a 20 microsecond spacing to the adjacent reference pair at either end of the sliding pulse range. The circuits for identifying the sliding and reference pulse pairs will not respond to a 20 microsecond pulse separation and hence will not give erroneous identification.

It is possible to derive tan-angle information from the sliding pulse pair by comparing the pulse pair with either the preceding or subsequent reference pair 56, 61, and various combinations of first and second pulses in these pairs may be employed for the purpose. However, it is preferred to employ the time interval between the second pulse of the sliding pair and the second pulse of the next following reference pair to represent the tangent of the elevation angle, as shown at 84 in FIG. 10i. The circuitry will be further described with this in mind. For other combinations, suitable modifications may be made by those skilled in the art.

From the description so far given, it will be observed that the voltage comparator 68 determines the generation of the first pulse 74 of the sliding pair, whereas it is desired that the second pulse 78 represent the tangent of the angle then existing. This can be taken into account by returning potentiometer 71 to a minus voltage source corresponding to the coding interval, 14 microseconds. For example, if a sweep range of 180 microseconds corresponds to an angular sweep range of 20°, 14 microseconds corresponds to about 1.5°. Thus, the bias voltage $-V_1$ may be selected to equal the voltage increment along the potentiometer corresponding to the angle through which the antenna beam moves in the coding interval.

A further factor needs to be taken into account. As so far described, the occurrence of the second pulse 78 of the sliding pair represents the tangent of the then-existing elevation angle. However, since the airborne receiver will not be able to determine this angle until the transmission of the second pulse 61 of the next reference pair, it is advantageous to have the angle information represent the angle which exists at the time of the transmittal of the second pulse of the reference pair. Otherwise an error will result which may be substantial, or else compensation will be required in the airborne receiver. For example, at a low angle, the sliding pair may be transmitted about 200 microseconds before the arrival of the reference pair with which it is to be compared. During that time interval the elevation angle will have changed approximately 0.04°. On the other hand, at a high angle the sliding pair may be transmitted of the order of 50 microseconds before the reference pair, at which time the elevation angle of the beam will have changed by about 0.01°.

To compensate for this, auxiliary potentiometer 72 adds a negative voltage to the output of potentiometer 71 representing the tangent of the angle the antenna beam moves in the time interval between the transmission of the sliding pair and the next reference pair. This added voltage is shown on a greatly exaggerated scale at 85 in FIG. 10e. It has a component varying with the elevation angle in the same manner as voltage 60, but over a much smaller voltage range. There is also a fixed component corresponding to the angle the beam moves in the time interval between the transmission of a sliding pair at the end of the sliding pair range and the transmission of the next reference pair.

For the position of 74, 78 shown in FIG. 10g, corresponding to a 10° elevation angle, the added voltage represents an angular movement in the time interval 84 (FIG. 10i) which is slightly over 0.02° under the numerical assumptions here made. Inasmuch as the maximum correction is for only a few hundredths of a degree movement, minor deviations in the added voltage will be unimportant.

The voltage from the slider of potentiometer 72 is added to that from 71 by a suitable adding or summing circuit. As shown, the voltages are supplied to comparator 68 through isolating resistors 81, 81' to prevent interaction. Summing circuits are well known in the computer field and refinements may be incorporated if necessary.

It will be noted from FIG. 10 that the second pulse 61 of the reference pair occurs simultaneously with each fifth increment pulse 51. It will also be appreciated that since the sliding pulse pair 74, 78 moves in time with the elevation angle, its occurrence will coincide with different increment pulses during the beam sweep.

As will be described, in the airborne receiver increment pulses are counted and it is advantageous to count reference and sliding pulse pairs as single pulses in lieu of corresponding increment pulses. Thus, the arrangement of FIG. 9 provides a blanking circuit 53 arranged to blank out certain increment pulses under the control of the reference and sliding pulse generator circuits. This also avoids overloading the RF transmitter by preventing the transmission of two pulses very close together.

Blanking during the transmission of a reference pulse pair is obtained by supplying the initial pulse of the pair through lines 57 and 82 to the blanking circuit 53. This triggers the blanking circuit to close a gate therein which prevents the transmission of the next increment pulse. The blanking circuit is arranged, however, so that the gate is reopened by the next increment pulse after a slight time delay so that it is ready for operation when blanking is next required.

For the sliding pulse pair, provision is made to blank out either the preceding or succeeding increment pulse, depending upon the time occurrence of the sliding pair with respect thereto. To this end a gate trigger pulse is generated a predetermined interval in advance of a sliding pulse pair, as shown at 83 in FIG. 10h. This is accomplished by employing a second potentiometer 73 which operates in the manner described for potentiometer 71, but develops a voltage which always exceeds that of potentiometer 71 by a predetermined amount corresponding to the desired interval between pulse 83 and the sliding pulses 74, 78.

For this purpose the slider of potentiometer 73 could be set ahead of that of 71, but this may not always be satisfactory since it will reach the end of its travel before that of 71. It is preferred to return potentiometer 73 to a bias source $-V_3$ selected to give the desired difference in voltage outputs, with suitable selection of the voltage applied to the upper end to give the same variation range as for potentiometer 71. The voltage for potentiometer 73 is compensated by that from potentiometer 72. Since the circuit arrangement is similar to that of potentiometer 71, no further description is deemed necessary.

The combined voltage is supplied through line 70 to the voltage comparator 67 which functions in the manner described in connection with comparator 68. Comparator 67 yields output pulses 83 as shown in FIG. 10h, which are supplied to the blanking circuit 53 to close the gate therein. The dotted lines 83' show the interval before the gate reopens.

The amount by which trigger pulse 83 precedes pulse 74 is advantageously selected to be slightly greater than the coding intervals employed, say 18 microseconds, so as to blank out an increment pulse which might be falsely identified as the first pulse of a reference or sliding pair. Thus any increment pulse preceding a sliding pair by less than 18 microseconds will be blanked out in 53. That increment pulse will then reset circuit 53 so that the succeeding increment pulse will be transmitted. If the sliding pair starts more than 18 microseconds after a given increment pulse, that pulse will be transmitted and the succeeding pulse blanked out. FIG. 10h shows the latter condition, gate 83, 83' terminating just after the blanking out of the increment pulse succeeding sliding pair 74, 78. By employing a blanked-out increment pulse to reopen the blanking circuit as described, proper blanking is assured even though the increment pulse spacing varies during the vertical beam scan.

The resultant transmitted signal from one site is illustrated in FIG. 10i. Here the pulses and pulse pairs are labelled with the same numerals used above. The increment pulse after each sliding pair 74, 78 is omitted since it has been blanked out. The second pulse 61 of a reference pair replaces the corresponding increment pulse. The double arrow 84 indicates the time interval between the second pulse 78 of a sliding pair and the second pulse 61 of the next reference pair which represents the tangent of the elevation angle at the instant of transmittal of pulse 61. As the elevation increases, the time interval 84 will decrease, and vice versa. Assuming the signal is from Site 2, that from Site 1 will be similar except that the separation of the reference pulses 56, 61 will be different, say 12 microseconds rather than 16 microseconds.

It will be understood from the above description of the encoder that the scanning beam is coded as a function of the elevation angle thereof with a coding resolution corresponding to small portions of a degree. This enables a change in beam angle of a small portion of a degree to be distinguished. Thus, in the specific numerical example given, reference-sliding pulse modulations are transmitted for each 0.05° movement of the beam, giving a high degree of angle resolution. The increment pulses supplement the reference-sliding pulse modulations to provide an even greater resolution, averaging about one increment pulse (or equivalent sliding or reference pulse pair which replaces an increment pulse) per 0.01° movement of the beam. This coding resolution, together with a plurality of beam scans per second, makes available to the aircraft information from which it can continually determine its precise angular position at short intervals so that changes therein due to speed of travel, sudden gusts of wind, failure of the pilot or autopilot to maintain a desired path, etc. are quickly and accurately known.

Turning now to the airborne equipment, this may be considered as composed of two units. One is for receiving and decoding the transmissions from Sites 1 and 2 and developing outputs representing the angle of the aircraft with respect to each site. The other is a computing and display unit which determines the path to be followed during the landing maneuver and gives suitable indications to the pilot for flying the plane along the selected path.

Figure 11:
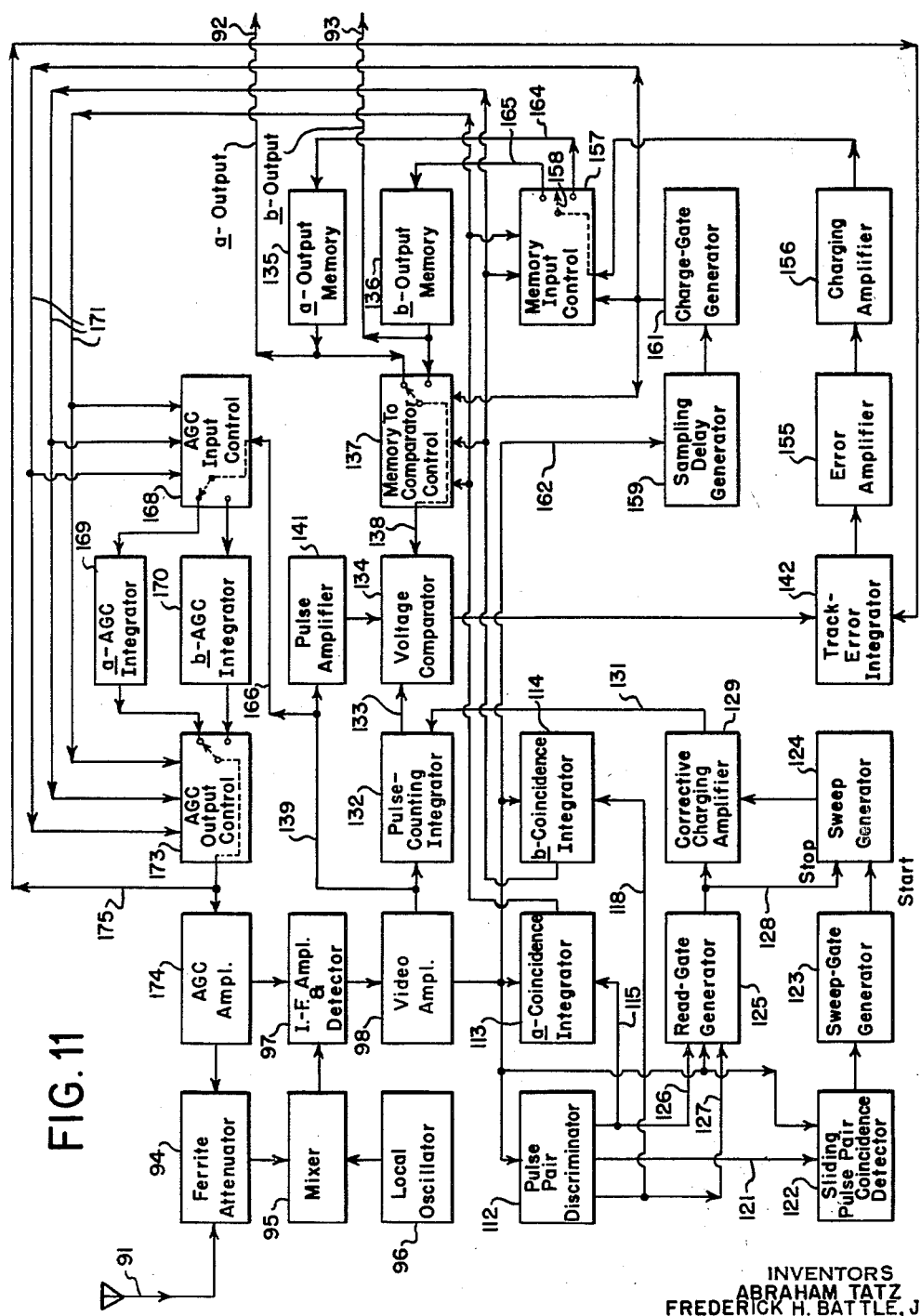
FIG. 11 is a block diagram of an airborne receiver.

FIG. 11 is a block diagram of the first unit. Overall, transmissions from both Sites 1 and 2 are received by antenna 91 at the left of the diagram, and voltages proportional to the tangents of the elevation angles from the sites are delivered at 92 and 93 at the right of the diagram. The outputs are denoted a and b, respectively, in accordance with the nomenclature previously established. The receiver is of the superheterodyne type and provision is made for good automatic gain control (AGC) inasmuch as signals may vary widely in strength as the aircraft approaches the runway.

As specifically shown, the antenna 91 is connected through a ferrite attenuator 94 to a mixer 95. Local oscillator 96 is also connected to the mixer, and may be an oscillator and multiplier chain to give a suitable frequency for mixing with the received K-band signal. The intermediate frequency output of mixer 95 is supplied to an IF amplifier and detector 97 and thence to video amplifier 98. The output of the video amplifier 98 will consist of pulses alternately corresponding to Sites 1 and 2.

As will be apparent from FIG. 1, as the beam from one site, say Site 1, scans past the aircraft, transmissions will be received for a length of time during each traversal determined by the beam width and the sensitivity of the receiver. The signal strength will in general be strongest at the middle of the beam and weaker on the sides thereof. This is shown schematically at 99 in FIG. 12. In between the transmissions from Site 1, similar transmissions will be received from Site 2, as shown at 101. No attempt is made to show the pulse transmissions in detail since a large number of pulses are received during a single beam traversal.

When the aircraft is quite far from the runway, the beam strengths from the two sites may be expected to be approximately equal for equal transmitted powers. As the aircraft approaches the runway, the received power from both sites will increase, but that from Site 1 will ordinarily be greater since it will be nearer to the aircraft. Thus, received beams 99 and 101 are shown of different amplitude. With effective AGC control, the output of video amplifier 98 will be substantially the same for both beams.

The video output is used to develop a voltage from the sliding pulse pair proportional to the tangent of the elevation angle, a stepped voltage from the increment pulses, and voltages for AGC and control purposes. The sliding pair voltage is used to put the stepped voltage on an absolute rather than a relative basis, and to correct it thereafter as necessary.

Before describing the circuits for accomplishing these results, reference will be made to FIG. 13 to explain the overall operation.

Referring to FIGS. 13a, b and c, a portion of the received beam 99 of FIG. 12 is shown on a greatly enlarged scale. FIGS. 13a and b show the increment pulses and the sliding pulse and reference pairs separately, for convenience of explanation. FIG. 13c shows a small portion of the composite signal as actually received. For the particular time occurrence of the sliding and reference pairs shown, certain increment pulses will not be present as heretofore explained, and they are shown dotted. For other beam elevations, different increment pulses will be eliminated. It will be noted that the spacing between the sliding pulse pair 74, 78 and the reference pulse pair 56, 61 increases from left to right, indicating a decrease in elevation angle. This has been greatly exaggerated for clarity. Also, the difference in separation of the pulses of the sliding and reference pairs has been exaggerated.

The pulses are applied to a pulse counting circuit which develops a stepped voltage as shown at 102 in FIG. 13d. The dotted line 103 represents the average of the steps. If the increment pulses alone were being received, these steps would be nearly uniform. However, the sliding pulse pair may not occur at exactly the same instant as the increment pulse it replaces, so that some steps may be longer than the increment pulse separation and the next steps shorter. For example, see 102' and 102''. The voltage increment for each step advantageously remains constant regardless of step length.

Although two pulses of a sliding or reference pair replace a single increment pulse, it is desirable that the pairs be counted as single pulses. This may be accomplished by designing the pulse counting circuit so that, after counting one pulse, an interval of time must elapse before it is able to count another. This interval may be made slightly greater than 16 microseconds with the numerical values here assumed.

A sliding pulse pair is employed to initiate a corresponding sweep gate, as shown at 104 in FIG. 13e. This sweep gate starts with the second pulse 78 of the pair and in turn starts a linear sweep 105 in an associated sweep generator. The arrival of the second pulse of the reference pair terminates the sweep gate, as indicated at 106, and stops the sweep generator at the corresponding point 107. This is accomplished by a read-gate generator controlled by the second pulse of a reference pair to generate a gate as shown at 108 in FIG. 13g. As actually designed, the read-gate simultaneously terminates the sweep gate and the sweep of the sweep generator. However, the functions are shown separately for clarity of explanation.

It is also possible to start the sweep by a reference pair and terminate it by a sliding pair, since the time intervals between the sliding pair and the reference pairs on either side thereof vary with the tan-angle. If the beam coding represents the tangent of the angle existing at the time the succeeding reference pair is transmitted, this factor must then be taken into account. Or, the beam coding could be changed. Here, however, it is assumed that the sliding pair starts the sweep and the next reference pair stops it, giving the tangent of the angle existing at the instant of stopping.

As the separation between sliding and reference pairs increases from left to right, the sweep continues for a greater length of time as shown at 105'. It will therefore be seen that the terminal sweep voltage 107, etc. at the end of each sweep represents the tangent of the then-existing elevation angle of the beam. With the numerical values here assumed, terminal sweep voltages will be produced in the aircraft at 250 microsecond intervals.

It is possible to determine the beam angle very accurately in this manner. However, the beam moves 0.05° in this 250 microsecond interval. More frequent transmission of sliding and reference pulse pairs would give angular information at shorter intervals, but would increase the precision required in the measuring circuits and introduce difficulties in the generation of the pulse pairs.

To avoid such difficulties and yet increase the precision, the step voltage produced by the pulse-counter is forced to equal the terminal sweep voltage 107 at the end of each sweep, and successive steps add small angle increments until the end of the next sweep 105. The dot-dash lines 108 in FIG. 13d indicate the sweep voltages on the same scale as the step voltages. It should be understood, however, that only the terminal voltage at the end of each sweep is applied to the pulse counter rather than the entire sweep.

In operation, when the beam first starts to scan across the aircraft, the pulse counter will start off at some initial voltage, say zero, and produce one or more step increments. Upon arrival of a sliding pulse pair and the next reference pulse pair, a terminal sweep voltage will be produced representing the tangent of the angle then existing. The step voltage is then forced to the value of the terminal sweep voltage so that thereafter the step voltage represents tangents of the angles on an absolute basis. If thereafter each pulse and pulse pair is properly counted, no further correction will be required from subsequent terminal sweep voltages. However, if because of noise or other disturbance one or more pulses fails to be counted, or extra counts occur, the next terminal voltage will restore the proper step voltage. In any interval between successive terminal voltages, such as that shown at 102, the pulse counter will add successive tangent increments corresponding to very small angular increments averaging 0.01°. Thus, a very precise measurement of angle is possible with great reliability.

It will be observed that if the vertical voltage scale in FIG. 13(d) is chosen so that the up direction corresponds to changes in the positive direction, line 103 represents a voltage which is increasing in the positive direction as the scanning beam angle decreases. Thus the voltage V at any time is of the form $V=V_0-Ka$ for the front site, or $V=V_0-Kb$ for the rear site, where $V_0$ is the voltage for a zero angle and K is the constant of proportionality. The change in V is proportional to the angle or tangent of the angle, depending on the transmitter coding, but is in the negative direction as the angle increases. This may be taken into account in subsequent computing or indicating circuits, as will be understood by those skilled in the art. If the transmitter coding were changed so that the time interval between sliding pulse pairs and the succeeding reference pulse pairs increased as the angle increased, the relationship would be $V_0+Ka$. On the other hand, if the vertical voltage scale in FIG. 13(d) were chosen so that the up direction corresponded to changes in the negative direction, line 103 would represent a voltage increasing in the negative direction as the angle decreases, so that $V=V_0+Ka$, and subsequent computing or indicating circuits would be designed accordingly.

Describing now the circuits of FIG. 11 controlled by the sliding and reference pulse pairs, the output of video amplifier 98 is supplied to a pulse-pair discriminator 112 and to coincidence integrators 113 and 114. Discriminator 112 is used in the identification of the pulse pairs and may take any suitable form for the purpose. For example, it may be a delay line with taps at 12, 14 and 16 microsecond intervals.

Considering first the reference pulse pairs, the arrival of the first pulse of the pair from Site 1 will issue from discriminator 112 at line 115 with a 12 microsecond delay. It will therefore arrive at coincidence integrator 113 simultaneously with the second pulse of the reference pair from video amplifier 98 and produce an output voltage. Advantageously a short integration period is provided so that false operation will not result from noise, etc., at the beginning of the scanning of the beam across the aircraft when the received signal level is low. This is shown at 116 in FIG. 12. The integrator may be designed to reach a maximum output voltage after the arrival of a few reference pulse pairs.

In this specific embodiment the integrator 113 is used as a triggering device so that the shape of the output wave during the remainder of the passage of the beam is not important, as indicated by the dotted portion 117. However, after one passage of the beam the output should decay sufficiently promptly to be ready for the next passage.

Similarly, when a reference pulse pair of 16 microsecond separation arrives from Site 2, the first pulse of the pair will issue from discriminator 112 with a 16 microsecond delay and be applied through line 118 to coincidence integrator 114, simultaneously with the arrival of the second pulse of that pair from the video amplifier 98. The output of integrator 114 is shown at 119 in FIG. 12.

The first pulse of a sliding pulse pair will be delayed by 14 microseconds and applied through line 121 to the sliding pulse pair coincidence detector 122 simultaneously with the second pulse of that pair from the video amplifier, and produces a corresponding output pulse. This output pulse is applied to a sweep gate generator 123 to start a sweep gate as shown at 104 in FIG. 13e. This gate is supplied to sweep generator 124 to start sweep 105.

Read-gate generator 125 is supplied with pulses direct from video amplifier 98, and with delayed reference pulses from discriminator 112 through lines 126, 127. Generator 125 contains a coincidence circuit so that it responds only to reference pulse pairs from either Site 1 or 2, depending on which is then transmitting, and generates a gate 108 (FIG. 13g) which starts at the instant of arrival of the second pulse of a reference pair. The read-gate 108 is applied through line 128 to the sweep generator 124 to terminate the sweep, as previously described.

In one particular circuit, the sweep gate generator 124 contained a diode and suitable circuitry arranged to charge a capacitor linearly. The diode was normally biased beyond cutoff and was switched to conduction by sweep gate generator 123. The arrival of read-gate pulse switched the diode off to stop further charging of the capacitor. After the charged capacitor had performed its correcting function, it was discharged by the termination of the read-gate.

The output of the sweep generator 124 is supplied to a corrective charging amplifier 129 having a low output impedance. Amplifier 129 is normally biased beyond cutoff, but when a read-gate pulse 108 is applied thereto it is turned on and supplies a voltage through line 131 to the pulse counting integrator 132 which is proportional to the final sweep voltage 107. This serves to correct the step voltage in integrator 132 as previously described. The gate pulse 108 is made sufficiently long to allow the correction to be made, whereupon generator 125 reverts to its initial condition, ready for the next reference pulse pair.

Pulse-counting integrator 132 is supplied with pulses from video amplifier 98 to generate the step function 102 described in connection with FIG. 13. Suitable circuits are known in the art and produce an output voltage which increases by a small increment for each successive pulse. as before described, it is desirable to adjust the speed of response at the input to integrator 132 so that the two pulses of a sliding or reference pulse pair will be counted as one pulse. The step voltage is periodically corrected by the sliding pulse information from amplifier 129. The output voltage in line 133 will then be like that shown at 102 in FIG. 13.

During a single passage of a beam over the aircraft a large number of angular indications will be received, depending upon the beam width, scan speed, etc. In order to determine the actual angular position of the aircraft with respect to the site, voltage comparator 134 is employed. This is supplied with the angle output voltage from integrator 132 through line 133. If previous angle information has been received, voltages representing the angular relationship of the aircraft from sites 1 and 2 will have been stored in output memories 135 and 136, as will be described hereinafter. Otherwise they will start from some reference potential. A control circuit 137 is employed to switch one or the other of memories 135, 136 through line 138 to voltage comparator 134, depending on whether the beam from Site 1 or 2 is being received. The control of circuit 137 will be described hereinafter.

The comparator 134 is also supplied with the output of the video amplifier through line 139 and amplifier 141. The comparator is designed to amplify video pulses from amplifier 141 proportional to their amplitude, and proportional to the difference between the pulse-counting integrator voltage and the then-existing memory voltage. Since the integrator voltage is varying substantially linearly in small increments during the passage of the beam, it will ordinarily pass through the voltage currently stored in the memory circuit. If the latter is correct, the two voltages will be identical just as the center of the beam is on the aircraft. The output of comparator 134 will change in polarity as the integrator voltage passes through the memory voltage.

The output of comparator 134 is supplied to a track-error integrator 142. If the memory voltage is correct, each video pulse occurring before the center of the beam passes will add an increment of charge to the storage circuit in integrator 142, and each pulse occurring after the center of the beam passes will subtract an increment of charge. The charges that are added will be cancelled by the charges that are subtracted, due to the integration. Thus, no error signal will be produced by integrator 142.

If the previously stored memory voltage is not correct, there will be an excess of positive or negative increments applied to integrator 142, and the output of the integrator will be proportional to the error in magnitude and polarity.

One suitable form of voltage comparator is illustrated in FIG. 14, and corresponding waveforms in FIG. 15. A pair of amplifier tube sections 143, 143' are shown connected as a differential amplifier with a common cathode resistor and individual plate resistors. Suitable power supply sources are provided. The step voltage from pulse-counting integrator 132 is applied to the control grid of one tube section, and the memory voltage to the control grid of the other tube section. The signal from the pulse amplifier is applied to the common cathode circuit.

If the two control grids are at the same potential, and the circuits are exactly balanced, there will be no difference output in lines 144, 144' regardless of the signal applied in the cathode circuit. However, if the potentials of the control grids are not the same, the signal in the common cathode circuit will be amplified by different amounts in the two tube sections, and hence a difference voltage will appear between output lines 144 and 144'. This difference voltage will be proportional to the amplitude of the signal and also proportional to the voltage difference between the control grids. The polarity will depend upon the relative potentials of the two grids.

FIG. 15 illustrates the operation. The signal from the pulse amplifier 141 is shown at 145. The voltage from the pulse-counting integrator 132 applied to the grid of tube section 143 is shown by line 146. The step increments are too small to be shown on this scale. Line 147 represents the voltage previously stored in the memory circuit, say 135, and supplied to the grid of tube section 143' from the control circuit 137.

As illustrated, 147 represents the correct voltage for the then-existing angle of the aircraft to the corresponding site. Initially, voltage 146 is less than 147 and consequently one tube section will amplify more than the other, yielding an output in lines 144, 144' as shown at 148. As voltage 146 passes through 147, the amplifications become equal and a zero output is obtained, as shown at 149. When voltage 146 goes above 147, the other tube section has the greater amplification and an output of opposite polarity is obtained, as shown at 150. If the pulse wave 145 is symmetrical, the positive and negative portions 148, 150 will be equal and, when integrated in track error integrator 142, a net output of zero will be obtained.

If the previously stored signal from the memory circuit is below the correct value for the then-existing angle to the site, as shown by dotted line 147', the point at which the voltages become equal will move to the left. This shifts the point of zero output to the left, as shown at 151. The negative portions 152 will be of greater amplitude and duration than the positive portions 153. When these are integrated a resultant negative voltage will be obtained, as indicated by line 154. This will appear at the output of track error integrator 142 and represents the difference between the previously stored memory voltage and the correct voltage.

This error voltage is used to correct the memory voltage, as will be described. If the transmitted beam is not symmetrical, the memory voltage will reflect the dissymmetry. However, this will be a constant factor and can be taken into account in equipment calibration.

Returning to FIG. 11, the error voltage from integrator 142 is supplied through an error amplifier 155 and a charging amplifier 156, advantageously acting as a constant current generator, to the memory input control circuit 157. The latter is a switching circuit which controls the supplying of the output of charging amplifier 156 to memory circuits 135, 136. The error signal will reach its proper value only after the beam has passed over the aircraft. During the passage of the beam, the output of amplifier 156 is isolated, as indicated by the neutral position of switch 158 in the control circuit 157. Immediately after the passage of a given beam, say that from Site 1, the output of amplifier 156 is supplied to the $a$-output memory circuit 135. This is accomplished by the sampling delay generator 159 and the charge gate generator 161.

The sampling delay generator 159, for example a delay multivibrator, is supplied with the output of video amplifier 98 through line 162 and produces an output to switch the charge gate generator 161 only after the beam has passed. The gate from generator 161 is shown at 163 in FIG. 12, and it will be noted that it starts after each beam 99 or 101 has passed. The duration of the gate is advantageously adjustable as shown by the double headed arrows. This gate is supplied to the memory input control circuit 157 so as to switch the output of charging amplifier 156 to one or the other of lines 164, 165. The direction of switch is determined by inputs from the coincidence integrators 113, 114.

Thus, immediately after the $a$-beam from Site 1 has passed, the control circuit 157 supplies the track error signal from charging amplifier 156 through line 164 to the $a$-output memory circuit 135. Similarly, after the $b$-beam from Site 2 has passed, control circuit 157 supplies the error signal through line 165 to the $b$-output memory circuit 136. Memory circuits 135 and 136 have their previously stored signals corrected by the respective track error signals, thus producing new stored signals representing the then-existing angular relationships of the aircraft to Sites 1 and 2. These are supplied through output lines 92 and 93 to the computer.

By making the duration of the charge gate 163 adjustable, the period during which the output of the charging amplifier 156 is supplied to the memory circuits is adjustable, so that the proper change in voltage of the memory circuits for the detected error can be obtained.

As has been described, the outputs of the memory circuits are supplied to the voltage comparator through the control circuit 137. This is a switching circuit under the control of the coincidence integrators 113, 114 which determine the direction of switching, and the charge gate generator 161 which determines the time of switching. It is arranged so that after a given beam has passed, it will switch to the memory circuit corresponding to the other beam.

Turning now to the AGC circuits, the output of video amplifier 98 is supplied through lines 139 and 166 to an AGC input control circuit 168 and thence to one or the other of AGC integrators 169, 170. Control circuit 168 is a switching circuit under the control of the coincidence integrators 113, 114 and the charge gate generator 161 whose outputs are supplied through lines 171. The circuit is similar to that of control circuit 137 in that, after one beam has passed, the AGC input control circuit 168 switches to the integrator for the other beam, ready for the passage of that other beam. This switching is illustrated at 172, 172′ in FIG. 12.

For each passage of the beam from a given site, the video signal will be supplied to the AGC integrator 169, 170 for that site. Each integrator has a time constant suitable for integrating over a number of beam passages. The output of integrator 169 or 170 is supplied through the AGC output control circuit 173 to the AGC amplifier 174. Output control circuit 173 is controlled similar to input control circuit 168. AGC amplifier 174 is connected to the ferrite attenuator 94 and to the IF amplifier 97 to control the gain thereof.

By this switching arrangement for the AGC circuits, it will be seen that the gains for the signals from Sites 1 and 2 are separately controlled so that outputs of substantially constant amplitude from video amplifier 98 may be obtained for signals from both sites.

The AGC circuits may not maintain an exactly constant output of video amplifier 98 even though great care is taken in the design. In such event the effect on the error signal can be reduced by supplying the AGC signal through line 175 to the track error integrator 142 so as to change the gain of the signal being integrated in a compensating direction.

Suitable circuitry for the individual blocks in FIG. 11 are known and the selection of appropriate circuits to accomplish the described functions will be clear to those skilled in the art from the above description. Although mechanical switches are shown in several of the control circuits for convenience of explanation, it will be understood that ordinarily electronic switching circuits will be employed.

Instead of the arrangement of FIG. 11, other arrangements may be employed within the broad scope of the invention to obtain signals in an aircraft representing its angular relationship with respect to the ground sites.

Knowing these angular relationships and the longitudinal distance D (FIG. 6) between the sites, the spatial position of the aircraft in a vertical plane may be determined by geometric principles, and a desired landing path computed. While this can be done in any suitable manner within the broad scope of the invention, several specific embodiments are described hereinafter which are considered advantageous.

In general, in the embodiments described, a function of a desired glide angle is determined by using one or both signals. This function may be the angle itself, or the tangent of the angle as specifically used herein. The function is then time differentiated to produce a glide angle rate error which is used during the initial portion of the landing maneuver.

The transition point from glide to flare-out is advantageously determined by using signals from both sites to determine the horizontal distance from a predetermined ground point, and developing a transition point signal when that distance equals a predetermined value. The horizontal distance is also time differentiated to obtain the ground speed at the transition point.

Beyond the transition point the signal from the rear site is used in conjunction with the ground speed at the transition point, time past the transition point, and predetermined constants to establish a relationship between the spatial position of the aircraft in a vertical plane and the rate of change thereof which yields a desired flare-out path. An error signal is then produced whenever the spatial position and rate of change thereof depart from this relationship. In FIG. 16 height and rate of change thereof are employed in the relationship, and in FIG. 17 the tangent of the angle from the rear site and the rate of change thereof.

Referring to FIG. 16, at the left is a block 177 representing suitable sources for the constants to be set into the computer. These may be voltage, current or mechanical sources as meets the requirements of the computer. The constants have previously been defined in connection with FIGS. 6 and 7.

The receiver and pulse decoder of FIG. 11 is indicated by block 178, and the outputs $a$ and $b$ thereof represent the tangents of the elevation angles of the aircraft from Sites 1 and 2, respectively.

Selected constants and the tangent information are supplied to various blocks in the computer, as indicated by arrows and letters denoting which constants are supplied to a particular block. In each block the algebraic manipulation taking place is indicated. Also, a brief description is given as to what the quantity calculated represents.

In the embodiment of FIG. 16 it is assumed that the glide angle aiming point is on the runway opposite Site 1, namely point 13′ in FIGS. 6 and 7. Suitable modifications for glide angle aiming points in front of the runway threshold will be described hereinafter.

At the right of FIG. 16 is a glide angle display 179 supplied with the quantity $a$. This display may take any desired form considered suitable for the needs of the pilot. Although directly responsive to the tangent of the elevation angle from Site 1, it may be calibrated in terms of the angle. This display informs the pilot of his actual glide angle during the initial straight line portion of the desired landing maneuver.

An Up/Down display is depicted at 180 and may take the form of conventional displays employed to indicate whether the pilot should fly up or fly down. In one type of instrument there is a fixed central marker 181, which may take the form of a minute airplane. The horizontal line 182 is commonly a needle which, when it passes through marker 181, indicates that the plane is flying correctly as to elevation. If needle 182 lies above marker 181, it indicates to the pilot that he should fly up, and when it is below, fly down. The vertical dotted line 183 gives the pilot information as to azimuth. Azimuth information may be obtained by transmissions from the ground with any suitable system, as mentioned hereinbefore.

Returning to the left of FIG. 16, in block 184 the distance $x$ is computed from the tangents of the angles from the two sites and the longitudinal distance D between the sites. The computed value of $x$ is then supplied to block 185, which differentiates $x$ with respect to time so as to determine the ground speed V. The distance $x$ is also supplied to the flare-out gate 186 which has the constants F and L set in. As is apparent from FIG. 6, the transition point between glide and flare-out paths is determined by the sum of F and L. Consequently, when $x$ equals F plus L, a gate signal is generated as depicted at 187, beginning at $t=0$.

This gate signal is fed to block 185 to stop the computation of V. Accordingly the output of 185 after the transition point is passed remains constant and continues to give the value of V at the transition point.

The gate signal is also fed to block 188 along with the value of V at the transition ponit. This starts the computation of V$t$, and accordingly gives the distance past the transition point. This distance involves an assumption that the horizontal ground speed of the aircraft remains constant between the transition point and touchdown. This will be approximately true under ordinary circumstances since the distances in the flare-out path, and the time of travel in that path, are quite short. During the flare-out path, the pilot will nose up his plane slightly so that the ground speed decreases somewhat, and if desired a multiplier of V slightly less than unity may be employed in the computation to take this into account.

In block 189 the value of V$t$ is subtracted from the sum of the constants F and L to obtain the residual distance in the flare-out path. This residual distance is denoted $x'$. In block 191 the height $z$ of the aircraft at any point in the flare-out path is computed by multiplying $x'$ and $b$, the then-existing tangent of the angle from Site 2. In block 192 the ratio F/S is multiplied with the ground speed and the height during flare-out to obtain a height quantity $M_1$ varying with height.

The height $z$ from block 191 is differentiated with respect to time in block 193 to obtain the rate of descent of the aircraft at any point in the flare-out path. This rate of descent is multiplied by $(x'-L)$ in block 194 to obtain a rate quantity $M_2$. The quantity $(x'-L)$ represents the distance to intended touchdown at any point in the flare-out path.

Equation (1) supra may be converted to the form:

$$\frac{dz}{dt}(x+L) = \frac{dx}{dt}(F/S)z \quad (2)$$

The quantity $x$ in this equation represents the horizontal distance from a point opposite Site 2 during the flare-out, and is denoted $x'$ in FIG. 16. Since V equals $-dx/dt$, Equation (2) then becomes:

$$\frac{dz}{dt}(x'-L) = -(F/S)Vz \quad (3)$$

The two sides of this equation are quantities calculated in blocks 194 and 192, respectively. If the aircraft is flying along the proper path, the two sides will be equal so that their difference will be zero. Otherwise, the difference will constitute an error which can be corrected by flying the plane upward or downward, as the case may be. Accordingly, the two quantities are supplied to block 195 which subtracts them to produce the error difference.

The error difference is supplied to the Up/Down display switch 196 through line 197. Also, the time differential of $a$ is supplied to switch 196 from block 198.

Switch 196 is controlled by the flare-out gate 187 through line 199. Prior to the initiation of the flare-out gate at $t=0$, the switch is in the upper position shown so that the glide angle rate error from block 198 is supplied to Up/Down display 180. During this portion of the path the pilot controls the plane so that needle 182 passes through marker 181, thereby maintaining the rate of change of the angle equal to zero.

At the transition point, the flare-out gate moves the display switch to the other position and supplies the error difference from block 195 to display 180. The pilot continues to control the aircraft to maintain needle 182 in registration with marker 181. This maintains the error difference equal to zero and indicates that the aircraft is on the desired flare-out path. This continues until the plane actually touches down on the runway at point 21 in FIG. 6.

If, during flare-out, a sudden gust of wind causes the plane to rise or fall from its proper path, a new $z$ will be calculated in block 191 and height quantity $M_1$ will change accordingly. From Equation 3 this requires a new rate of descent $dz/dt$ in order to bring the plane to touchdown at the predetermined point. Accordingly, an error difference will be produced by block 195 until the pilot changes the rate of descent to reduce the error to zero. Thereupon the aircraft will fly along a suitable corrected flare-out path portion until the plane touches down.

A particular advantage of the present system is that the pilot need observe only one display 180 during both glide and flare-out portions of the landing maneuver. During both operations simple indications to fly the plane up or down suffice.

If desired the outputs of any of the blocks may be separately displayed in order to inform the pilot of any parameters in which he is interested. Commonly he will want to know the actual glide angle and this display is shown at 179. If he wishes to know his distance in the glide path, a display can be taken from block 184 as indicated by the dotted arrow. If he desires to know the distance to touch-down or his height during flare-out appropriate displays may be fed from blocks 189 or 191, respectively. These displays may be provided as determined to best meet the needs of the pilot.

The preceding explanation has assumed that the pilot is personally controlling the aircraft during the landing maneuver. However, it will be understood that the outputs from blocks 198 and 195 may be used to control an automatic pilot system to land the plane automatically.

In the preceding explanation the aircraft has been treated as though it were a point, with the landing wheels coinciding with the antenna receiving the angular information and the ground-base antennas have been treated as though they were actually at runway level. In practice, the origin of the ground beams will be somewhat above the runway, and the antenna in the aircraft will be above the landing wheels. These factors will have an effect on the actual point of touchdown of the wheels.

For discussion, assume that the effective origin of the ground beam is five feet above the runway and that the antenna in the aircraft is twenty feet above the wheels. Then the wheels will actually touch down when the elevation of the aircraft antenna from the ground-based antenna is fifteen feet. This means that the rate of descent at the actual point of touchdown will be slightly greater than that calculated neglecting antenna heights (zero). The flare-out path will ordinarily be sufficiently gradual in its final portions so that the difference is negligible. If not, the constants set into the computer may be selected to provide as gradual a flare-out path as desired.

FIG. 17 shows a modification of the computer in which, instead of using the tangent of the angle from Site 2 to compute the aircraft height and then taking the derivative of the height, the tangent of the angle and its time derivative are used directly. The portions to the left of the dash line 201 and those to the right of dash line 202 are the same in both figures.

In FIG. 17 block 203 takes the time derivative of $b$ and supplies it to block 204. Block 189 is the same as in FIG. 16 and supplies the quantity $x'$ to block 205. Inasmuch as $z=bx'$, by taking the time derivative and substituting in Equation 3, straightforward algebraic manipulation yields the following equation:

$$x'(x'-L)\, db/dt = -bV[x'(F/S-1)+L]$$

The left side of this equation is the tangent rate quantity $M_3$ calculated in block 204. The right side is the tangent quantity $M_4$ calculated in block 205. Both quantities are supplied to the error difference block 206 where they are subtracted. The error difference is then supplied to the Up/Down display switch 196. When the error is zero, the aircraft is on the selected flare-out path. When it departs from zero, the pilot flies the plane up or down, as the case may be.

As will be apparent from the foregoing explanation of FIGS. 16 and 17, the flare-out computers compute a function of the angle of the aircraft with respect to the rear (Site 2) transmitter corresponding to a desired flare-out path which gradually becomes more shallow between the transition point and touchdown, and continually utilize the rear beam signal to produce an error signal upon departure from the desired path. In the specific embodiments of FIGS. 16 and 17 the function of the angle includes both the angle itself (or tangent thereof) and the rate of change of angle. This is explicit in Equation 4, and implicit in Equation 3 from which Equation 4 was derived. Also, the computers utilize the value of the rear beam signal at the transition point (decoded signal $b$ at $t=0$) in determining the initial conditions of the function. Thus, if the transition point is changed, the initial conditions of the function will be changed so that a different flare-out path will be prescribed suitable for the changed transition point.

FIG. 18 shows a modification which permits the pilot to aim at a point ahead of the runway threshold during the initial glide. Block 184 is the same as in FIG. 16 and supplies the quantity $x$ to block 211 which subtracts P therefrom. Accordingly, the output of block 211 represents the horizontal distance to the desired glide aiming point. The output of block 184 is also supplied to block 212 along with $b$ so as to calculate the height of the aircraft. Block 212 is similar to block 191 in FIG. 16. However, block 212 calculates height prior to the transition point whereas block 191 calculates height after the transition point.

The outputs of blocks 211 and 212 are supplied to block 213 which performs the indicated division so as to obtain the glide slope $g$, which is the tangent of the angle the aircraft should follow during the glide portion of the landing maneuver. See FIG. 6. The output of block 213 is supplied to the glide angle display 179 which functions in the same manner as in FIG. 16.

The output of block 213 is also supplied to block 214 which differentiates $g$ with respect to time to give the glide angle rate error. The output of this block is supplied to switch 196 and, prior to the transition point, to the Up/Down display 180. Accordingly, when the pilot flies his plane to maintain the glide angle rate error equal to zero, he will be flying along a glide path toward the selected aiming point 33 of FIG. 6.

The flare-out path is determined in the same manner as that described in FIGS. 16 and 17. The error difference in line 197 as developed in FIG. 16 or 17 is supplied to the switch 196 and thence to the Up/Down display 180 after passing the transition point.

It will be noted from FIG. 6 that the quantities F, L, P and S are not completely independent, in that the sum of the first two must equal the sum of the second two. However, many combinations may be selected within this limitation. Block 117 (FIG. 16) may be designed with an interlinkage so that the limitation cannot be violated.

An important aspect of the present system is that its performance can be checked in the aircraft prior to committing the aircraft to land. This is of considerable importance, since after an aircraft has passed a certain point in its landing maneuver it may be difficult or impossible to avoid landing even though the landing system is found to be functioning improperly. Further, in order for the pilot to have complete confidence in the landing system, it is advantageous to be able to compare the performance of the system with information derived from other instruments in the aricraft on which the pilot customarily relies.

Referring to FIG. 19, blocks 184 and 185 are those shown in FIG. 16 and utilize the angular information from both Sites 1 and 2 to calculate the ground speed. Aircraft customarily carry air speed indicators and some carry ground speed computers and indicators. A ground speed computer is shown at 215 and is designed to receive information concerning the relative heading of the plane, the air speed and the runway wind setting, and calculates the ground speed from this information. The outputs of blocks 185 and 215 are supplied to a difference comparator 216 and then to a monitor alarm and display 217. If the difference between the ground speeds is greater than normal, the pilot will be alerted to the fact that one or the other computer is not functioning properly, and can act accordingly.

The accuracy of the present system increases as the aircraft approaches the runway and is highly accurate as the aircraft approaches a normal transition point. However, when monitoring the system at a position remote from the runway, there may be considerable variation between the calculated ground speed and that indicated by the conventional computer. Accordingly, a threshold setting may be supplied to the display 217 as indicated so that an alarm will not be set off unless the error is greater than that normally to be expected.

If the aircraft contains only an air speed indicator, the pilot may make a calculation based on his air speed, wind conditions reported from the airport, etc. to obtain his approximate ground speed. The ground speed calculated in block 185 may be displayed so that the pilot can quickly cross check.

Suitable circuits and devices for performing the calculations indicated in the blocks of FIGS. 16–19 are well known in the computer field and it is unnecessary to describe them in further detail. It will be understood that the specific calculations performed in the blocks are based on the coordinates and parameters as defined in connection with FIG. 6, and that if other coordinates and parameters are chosen suitable modifications may be made in the calculations. If the angle instead of tangent information is transmitted from the ground-based sites, it may be converted to tangent information in the aircraft or otherwise used in the computation.

In the specific embodiments as desrcibed above, scanning beams are employed at both Sites 1 and 2. This is preferred and has many ardvantages. However, at the present time instrument landing systems are known in which a beam, or the equivalent of a beam formed by a combination of two or more radiation patterns, is transmitted from a ground site in order to provide glide path guidance to the pilot. A receiver in the aircraft receives the beam transmissions and develops a signal corresponding to the glide angle, or departures therefrom, and the signal is displayed so that the pilot can fly his plane along the prescribed glide path. In the United States the so-called ILS system is of this character, and is installed at many airports. A localizer beam system for guiding an aircraft along the center line of the runway is also provided.

Such glide path systems do not have sufficient accuracy to justify reliance thereon to touchdown except under emergency conditions, and a minimum ceiling and minimum horizontal visibility are specified for normal operation. Also, the glide path is fixed, and if continued to touchdown is too steep for normal operations. In the ILS system the glide angle is some value between about 2½° and 3°, depending on the airport, and the angle for a given installation is known.

Such a fixed glide angle guidance system may be used in lieu of the scanning beam at the front Site 1, in conjunction with a scanning beam at the rear Site 2, either as an interim system or where the operating requirements do not justify the preferred system.

FIGS. 1–7 serve to illustrate this system by assuming that the glide slope beam 15 is fixed at a given angle, rather than scanning, it being understood that the radiation pattern may differ markedly.

As will be clear from the detailed description of the figures, the glide portion of the landing maneuver can be controlled by the front site beam alone, and the flare-out portion by the rear site beam alone, both beams being used to determine the transition point from glide to flare-out. With a fixed glide path, an aircraft flying down the path will receive signals from the rear site beam corresponding to a decreasing angle. The angle from the rear site will be less than the glide path angle from the front site, and the difference (and the ratio of glide angle to rear site angle) will increase as the aircraft nears the runway. Thus, with a known site separation, a predetermined relationship of the angles corresponds to a given distance of the aircraft from the runway, and may be used to determine the transition point.

For example, with a 3° glide angle and a site separation of one-half mile (measured along the runway), when the angle of the aircraft is 1½° to the rear site, the aircraft will have a half mile to go with respect to the front site. If this is chosen as the transition point, approximately a mile is available for flare-out and touchdown. By computing a flare-out path for touchdown midway between the two sites, flare-out to touchdown takes place over a distance of about three-quarters of a mile, thus allowing a margin for the lesser accuracy of the glide path beam, pilot error, and effects of gusts.

Suitable instrumentation for the simplified system will be apparent to those skilled in the art from the description of the preferred system. The development of the front site beam system may follow known practice, and also the glide path receiving and indicating equipment in the aircraft. The rear site scanning beam is coded as a function of the elevation angle thereof, and coding in terms of the angle itself rather than the tangent will normally suffice. The aircraft receiver for decoding the scanning beam may be similar to that shown in FIG. 11, but considerably simplified since only one scanning beam need be decoded.

The computation of the flare-out path may be performed as desired, utilizing the angle signal derived from the rear site beam. The arrangements of FIGS. 16 and 17 may be modified for the purpose. Instead of inserting the front site angle $a$ as a measured value, it may be inserted as a constant corresponding to the known angle of the fixed glide path. The glide angle display 179 and rate error block 198 may be omitted if the aircraft has the conventional glide path instruments.

With the glide path system presently employed, the indicating accuracy may not be sufficient to justify a computation of ground speed as shown in blocks 184 and 185. Thus the flare-out computer may be further simplified by eliminating the computation of $x$ and $V$ in blocks 184 and 185, and inserting ground speed $V$ into block 188 as a constant otherwise determined by the pilot. In such case the flare-out gate block 186 may be modified to initiate the gate 187 when the angle $b$ bears a predetermined relationship to the known glide angle as discussed above. A suitable indicator may be actuated by switch 196 to inform the pilot when he should follow the flare-out display 180 rather than the glide angle display.

The invention has been described in connection with specific embodiments setting forth a preferred manner of coding the beams from the two sites and apparatus therefor, a particular form of airborne decoding receiver, and suitable computers, as well as a simplified system. Different forms of beam coding may be used within the broad aspects of the invention, with suitable decoding equipment and computers. With the preferred form of beam coding disclosed, modifications may be made in the encoding and decoding apparatus and in the computers to suit the requirements of a particular application. Particular shapes of flare-out paths have been described which are believed advantageous, but other shapes may be employed if desired. When desired, selected features of the invention may be employed and others omitted. Also, if additional angular information is desired, more than two sites may be employed and the circuits modified accordingly.

This is a continuing application of application Serial No. 825,469, filed July 7, 1959 by Tatz and Battle for "Aircraft Landing System."

We claim:

1. Aircraft apparatus for use in an aircraft landing system wherein an elevation guidance beam is transmitted from a site adjacent a runway and beyond the intended touchdown region, comprising:
   (a) means responsive to the guidance beam to produce an angle signal representative of the angular elevation of the aircraft with respect to the site,
   (b) flare-out computer means for representing a function of such angular elevation that corresponds to a desired flare-out path to said touchdown region, and producing an error signal in response to departure of said angle signal from a value that satisfies said function,
   (c) means responsive to said error signal for guiding the aircraft toward and substantially along the desired flare-out path,
   (d) means for producing a second positional signal representative of the value of a second coordinate of the position of the aircraft, and
   (e) means responsive at least in part to said second positional signal for guiding the aircraft along an initial approach path that precedes said flareout path and is directed toward a forward aiming point in advance of the intended touchdown region.

2. The invention set forth in claim 1, wherein said means for producing a second positional signal includes means responsive to a second elevation guidance beam that is transmitted from a second site in advance of the intended touchdown region, and said second positional signal is a second angle signal representative of the angular elevation of the aircraft with respect to the second site.

3. The invention set forth in claim 2, wherein said means for guiding the aircraft along an initial approach path is responsive to said second angle signal to define a glide path that lies in a plane through said second site.

4. The invention set forth in claim 2, wherein said means for guiding the aircraft along an initial approach path includes computer means responsive to said first and second angle signals to define a glide path directed at an aiming point in advance of the intended touchdown region.

5. The invention set forth in claim 4, wherein said computer means includes means for producing a signal representative of the distance of the aircraft from a fixed reference point.

6. The invention set forth in claim 1, wherein said second signal is representative of the distance of the aircraft from a reference point.

7. The invention set forth in claim 1, wherein said means for producing said second positional signal includes means responsive to a second elevation guidance beam that is transmitted form a second site in advance of the intended touchdown region to produce a second angle signal representative of the angular elevation of the aircraft with respect to the second site, and computer means responsive to said first and second angle signals to produce a signal representative of the distance of the aircraft from a reference point.

8. An aircraft landing system, comprising:
   (a) means for transmitting a fan-shaped vertically scanning guidance beam from a site adjacent a runway and beyond the intended touchdown region,
   (b) means for coding said beam as a function of its elevation angle,
   (c) aircraft equipment including receiver means for receiving and decoding said guidance beam to produce an angle signal that is a function of the elevation of the aircraft with respect to the transmitter site,
   (d) flareout means responsive to said angle signal for guiding the aircraft substantially on a desired flareout path to said touchdown region,
   (e) means for producing a second signal that is a function of another coordinate of the position of the aircraft,
   (f) glide means responsive at least in part to said second signal for guidance of the aircraft substantially on an initial approach path preceding said flareout path and directed toward a forward aiming point in advance of said desired touchdown region, and
   (g) means responsive to at least one of said signals to effect transition of the guidance from said glide means to said flareout means as the aircraft approaches said forward aiming point.

9. The invention set forth in claim 8, wherein said means for producing said second signal includes second transmitter means for transmitting a second beam from a second site adjacent the runway in advance of the intended touchdown region, and aircraft equipment for receiving said second beam and producing in response thereto a second angle signal that is a function of the elevation of the aircraft with respect to the second site.

References Cited in the file of this patent

UNITED STATES PATENTS

| | | |
|---|---|---|
| 2,205,185 | Adair | June 18, 1940 |
| 2,257,320 | Williams | Sept. 30, 1941 |
| 2,536,496 | Falloon | Jan. 2, 1951 |